(12) United States Patent
Nakahara

(10) Patent No.: US 7,181,075 B2
(45) Date of Patent: Feb. 20, 2007

(54) MULTI-LEVEL ENCODING/DECODING APPARATUS

(75) Inventor: Masanao Nakahara, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 778 days.

(21) Appl. No.: 10/464,564

(22) Filed: Jun. 19, 2003

(65) Prior Publication Data
US 2004/0213465 A1 Oct. 28, 2004

(30) Foreign Application Priority Data
Jun. 28, 2002 (JP) .............................. 2002-191482

(51) Int. Cl.
*G06K 9/46* (2006.01)
*G06K 9/60* (2006.01)
(52) U.S. Cl. .................................. 382/240
(58) Field of Classification Search ................ 382/232, 382/233, 240, 247, 248, 250, 251, 305; 375/240.03, 375/240.19, 240.2, 262, 264, 265, 286; 714/758, 714/786, 810
See application file for complete search history.

(56) References Cited
U.S. PATENT DOCUMENTS

| | | | | |
|---|---|---|---|---|
| 5,166,956 A | * | 11/1992 | Baltus et al. | ............... 375/286 |
| 5,467,132 A | * | 11/1995 | Fazel et al. | ............. 375/240.01 |
| 5,659,579 A | * | 8/1997 | Herzberg | ..................... 375/262 |
| 6,651,213 B2 | * | 11/2003 | Hassner et al. | ............. 714/763 |
| 2004/0213465 A1 | * | 10/2004 | Nakahara | ..................... 382/232 |

FOREIGN PATENT DOCUMENTS

JP 2002-101310 A 4/2002

OTHER PUBLICATIONS

Coefficient bit modeling, Annex C, ISO/IEC CD15444-1 : 1999 (V1.0, Dec. 9, 1999), pp. 69-78.

* cited by examiner

*Primary Examiner*—Amir Alavi
(74) *Attorney, Agent, or Firm*—Sughrue Mion, PLLC

(57) ABSTRACT

A multi-level image encoding/decoding apparatus, which performs bit modeling processing on coefficients, which are the result of wavelet transform of a multi-level image read out from a transform coefficient storage memory, by accessing a significance information memory, a plus/minus sign memory, a processed information memory and a refinement information memory, includes an address generator for generating an address for accessing the processed information memory and the refinement information memory and an address generator for generating an address for accessing the significance information memory and the plus/minus sign memory.

8 Claims, 25 Drawing Sheets

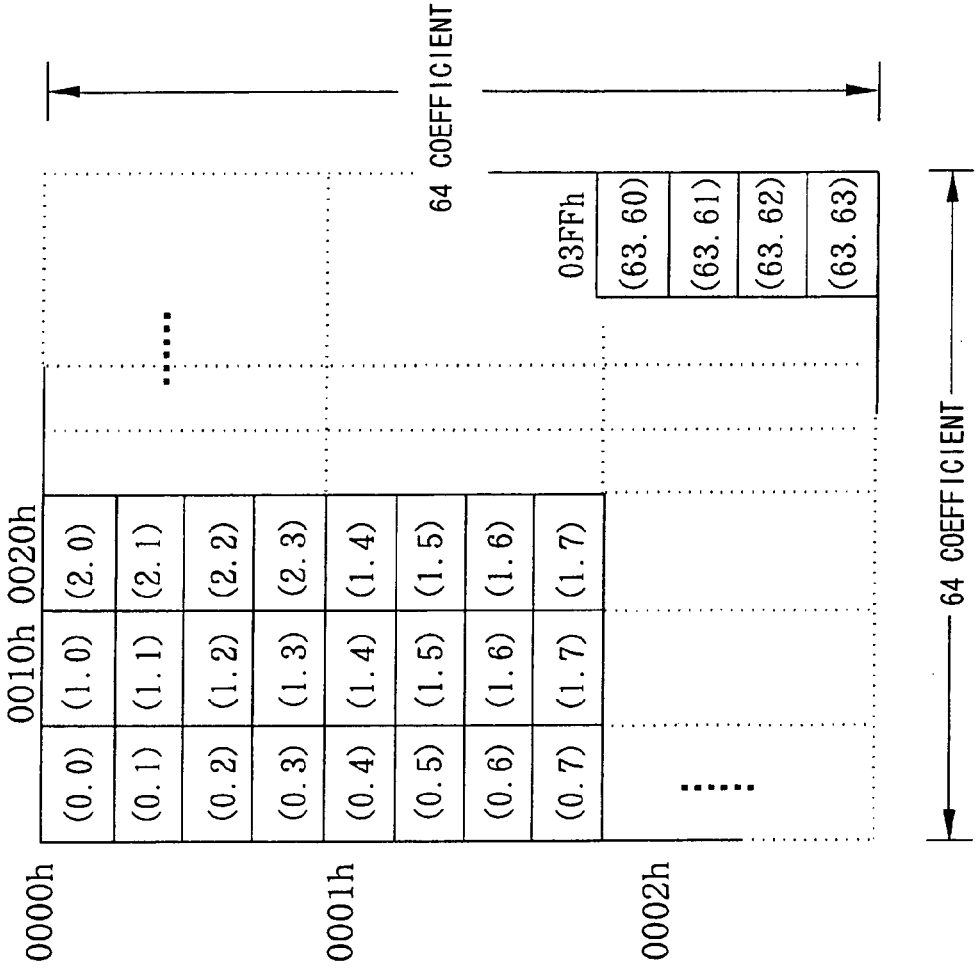

MULTI-LEVEL ENCODING/DECODING APPARATUS

FIELD OF THE INVENTION

This invention relates to a multi-level image encoding/decoding apparatus by the JPEG 2000 system.

BACKGROUND OF THE INVENTION

As the compression/expansion technique for a multi-level image, the JPEG system has so far been routinely used. The JPEG 2000 system, aimed at improving the image quality at a further ultra-low bit rate, has been developed, and expectations are made of this new system as being a high compression multi-function next-generation compression/expansion system for a wide field of application more favorable than the JPEG system. In particular, notice is stirred up in the field of a digital camera, facsimile and copying apparatus or a combination apparatus thereof.

Thus, the JPEG 2000 system is thought to be promising in the perspective of future utilization. However, technical difficulties are met in that, due to algorithm-related constraints, processing is more complex than in the conventional JPEG system, with the processing time being several times as long as that needed in the conventional JPEG system. In particular, long processing time in a bit modeling unit poses a serious problem.

The schematics of the processing by the JPEG2000 system are hereinafter explained. FIG. 10 shows the overall processing flow of the JPEG2000 system.

An input multi-level image 10-1 is subjected to wavelet transform 10-2, the resulting transform coefficients are subjected to quantization 10-3 and the quantized transform coefficients are processed with entropy coding 10-4 which generates output codes termed a codestream 10-5.

In the entropy coding 10-4, bit modeling processing 10-6 and arithmetic encoding processing 10-7 are executed. A unit of the image processed in the bit modeling processing 10-6 is a block of transform coefficients having a size of powers of 2 in each of the horizontal (vertical and horizontal) directions and the vertical direction, with the contents of the transform coefficients comprising positive and negative signs and absolute values of the quantized transform coefficients.

The processing during image compression is from left to right direction in FIG. 10, while that during image expansion is in an opposite direction, that is, from right to left direction. However, the procedure for bit modeling is not changed for compression and expansion. Thus, the following explanation is made for the compression side as the basis.

The overall processing contents of the JPEG 2000 system are stated in detail in ISO/IECI 5444-1, "JPEG2000 image coding system-part1: Core coding system".

In the JPEG2000 system, in distinction from the JPEG system, the entire processing is not executed to the same size range, but the wavelet transform and quantization are executed in a size range termed a tile.

In the next entropy coding, processing is executed with a code block (CB) 11-1, shown in FIG. 11, as a unit. The bit modeling processing is carried out with a two-dimensional bit plane 9-6 as a unit. The bit plane is obtained on resolving an absolute value 11-5, shown in FIG. 11, on the bit-by-bit basis, beginning from the MSB.

FIG. 12, shows the processing sequence within the bit plane. In FIG. 12, four transform coefficients, processed by one scanning in the vertical direction, are termed four vertical coefficients.

The bit modeling processing is now explained in detail. On a bit plane 11-6, the one transform coefficient, currently processed, of the four vertical coefficients, which are processed in the sequence shown in FIG. 12, is called a target coefficient 11-2. In the following, the bit in the target coefficient 11-2 lying in the bit plane being processed is called a current bit 11-3.

In the bit modeling processing, the context value of the current bit is calculated as indicating the feature of the image of the target coefficient. In this case, eight neighbor bits around the current bit are referenced for calculating the context value. FIG. 13 shows a context model composed of a current bit 13-1 and eight neighbor bits 13-2.

In the bit modeling processing, the absolute value 11-5 of the coefficient shown in FIG. 11 and the sign (plus or minus) of the coefficient are processed differentially. Specifically, the absolute value is processed on the bit plane basis and if, in this processing process, the target coefficient 11-2 is verified to be other than 0, the sign (plus or minus) is also processed.

If, for example, the coefficient following the wavelet transform is represented by 8 bits, the absolute value is represented by 7 bits, while the sign (plus or minus) is represented by 1 bit. For processing, eight processing operations are needed per coefficient at the maximum.

That is, in the JPEG2000 system, in distinction from the JPEG system, bit modeling processing is performed on the bit plane basis, so that the processing quantity for bit modeling processing is increased.

Referring to flowcharts of FIGS. 14 to 21, the bit modeling processing is explained. It is noted that the present invention is not concerned with the processing procedure of the bit modeling itself, but is principally aimed to optimize the memory storage method and the address generation, to reduce the number of access operations by the addition of registers and to improve the performance. Consequently, the flowcharts show simply the processing sequence relevant to this object. These are associated with any of the arrangements of FIGS. 1, 3, 22 and 24.

Meanwhile, in FIGS. 14 to 22, double dotted line blocks indicate the read and write for the associated respective memories.

FIG. 14 shows the bit modeling processing in its entirety and specifically shows the CB-based processing.

In the bit model processing unit, executing the bit modeling processing, the current bit, included in the SIG (significance propagation pass) of the bit plane, is calculated form the condition, and the processing shown in FIGS. 15 and 16 is carried out.

Then, a current bit of a coefficient, not included in the SIG pass, and which is included in the condition of the MAG (magnitude refinement pass) pass, is processed, in accordance with the flowchart shown in FIGS. 15 and 16.

Finally, the current bits, not as yet processed, are processed as the CLN (cleanup pass), in accordance with the flowchart shown in FIGS. 18 to 21.

These three passes are termed a three-pass processing. For the processing conditions, significance information, sign (plus or minus) information, refinement information and processed information, are needed.

The significance information is the information which becomes "1" when the target coefficient 11-2 shown in FIG. 11 is determined to be other than 0. The sign (plus or minus)

information is the information which becomes "1" when the target coefficient 11-2 shown in FIG. 11 is verified to be a negative coefficient. The refinement information is the information which becomes "1" when the processing of the MAG pass has come to a close and the processed information is the information which becomes "1" when the processing of the current bit in the bit plane has come to a close.

In the bit modeling processing, shown in FIG. 14, a significance information memory, a plus/minus sign memory and a refinement information memory are initialized in a step S101.

A step S102 is a loop (iteration) of a bit number of the absolute value of the wavelet coefficient. In the step S102, a loop counter(not shown) is counted down in a direction from the MSB to the LSB.

In a step S103, the processed information memory is initialized.

In a step S104, since there is a condition that, in the bit modeling processing, the first bit plane is to begin the processing from the CLN pass, it is verified whether or not a given bit plane is the first bit plane. If the given bit plane is the MSB (first bit plane), processing is carried out as from a step S107 and, if otherwise, the processing is carried out as from a step S105.

The step S105 is a processing of the SIG pass which is shown in detail in the flowcharts of FIGS. 15 and 16.

The step S106 is a processing of the MAG pass which is shown in detail in the flowcharts of FIG. 17.

The step S107 is a processing of the CLN pass which is shown in detail in the flowcharts of FIGS. 15 and 16.

FIGS. 15 and 16 show flowcharts showing the processing of the SIG pass and show detailed operation of the step S105 shown in FIG. 14.

A step S201 is a loop (iteration) in the vertical direction of the CB size, with an increment being 4. Thus, if the vertical size of the CB size is 64 pixels, a loop counter (not shown) counts up 0, 4, 8, 16, . . . .

A step S202 is a loop (iteration) in the horizontal direction of the CB size, with the count value becoming the horizontal coordinate of the coefficient being processed.

A step S203 is a loop (iteration) of the vertical four coefficients. The loop count value of step S201 and the count value of the step S203, combined together, become the vertical coordinate of the coefficient being processed.

In a step S204, the significance information of the current bit and the eight neighbor bits are read from the significance information memory, in accordance with the addresses calculated from the vertical and horizontal coordinates, specified by the loop counters (not shown) of steps S201 to S203.

If, in a next step S205, a value at a location corresponding to the current bit in the significance information being read is "1" (in this case, the current bit is retained to be significant), processing is not made in the SIG pass. Thus, the next following passes are skipped and processing goes back to the step S203.

If, in a step S206, a value at any one of locations corresponding to the eight neighbor pixels of the significance information being read is "1" (in this case, the one of the eight neighbor pixels is retained to be significant, the processing of a step S207 is carried out to output the context of the target bit. If all of the eight neighbor pixels are zero, in which case the eight neighbors are all retained to be insignificant, the next following processing is skipped to go back to the step S203.

In a next step S207, from the SIG context model of the eight neighbor pixels shown in the following Table 1:

TABLE 1

| Sum of horizontal significance | Sum of vertical significance | Sum of diagonal significance | Context value (output value) |
|---|---|---|---|
| 2 | any number | any number | 8 |
| 1 | 1 or more | any number | 7 |
| 1 | 0 | 1 or more | 6 |
| 1 | 0 | 0 | 5 |
| 0 | 2 | any number | 4 |
| 0 | 1 | any number | 3 |
| 0 | 0 | 2 or more | 2 |
| 0 | 0 | 1 | 1 |
| 0 | 0 | 0 | 0 | the context values of the target bit are found and output as the results the bit model processing.

In the above Table 1, the vertical direction denotes V0 and V1 in the eight neighbor pixels 13-2 in the context model shown in FIG. 13, while the horizontal direction denotes H0 and H1 in the eight neighbor pixels 13-2 in the context model shown in FIG. 13. The diagonal direction denotes D0, D1, D2 and D3 in the eight neighbor pixels 13-2 in the context model shown in FIG. 13.

The context values are formed by the number of the significance conditions in the respective directions. The context values denote the features of an image as calculated from the conditions of the eight neighbor pixels 13-2.

In a next step S208, the transform coefficient is read from the transform coefficient storage memory. In a step S209, the sign (plus or minus) of the transform coefficient read is also output as a result of the bit modeling processing.

If, at a step S210, the current bit is "0", steps S211 to S214 are skipped.

If, in the step S210, the current bit is "1", the transform coefficient is verified to be other than 0, so that, in the next step S211, the information as to the sign (plus or minus) of the eight neighbor pixels of the current bit is read from the plus/minus sign memory.

In a step S212, from the context model of the sign (plus or minus) shown in the following Table 2:

TABLE 2

| V0 or H0 | V1 or H1 | Decision value |
|---|---|---|
| Significance coefficient (plus) | Significance coefficient (plus) | 1 |
| Significance coefficient (minus) | Significance coefficient (plus) | 0 |
| Insignificance coefficient | Significance coefficient (plus) | 1 |
| Significance coefficient (plus) | Significance coefficient (minus) | 0 |
| Significance coefficient (minus) | Significance coefficient (minus) | −1 |
| Insignificance coefficient | Significance coefficient (minus) | −1 |
| Significance coefficient (plus) | Insignificance coefficient | 1 |
| Significance coefficient (minus) | Insignificance coefficient | −1 |
| Insignificance coefficient | Insignificance coefficient | 0 |

| Horizontal decision value | Vertical decision value | Context value (output value) |
|---|---|---|
| 1 | 1 | 13 |
| 1 | 0 | 12 |
| 1 | −1 | 11 |
| 0 | 1 | 10 |

TABLE 2-continued

| | | |
|---|---|---|
| 0 | 0 | 9 |
| 0 | −1 | 10 |
| −1 | 1 | 11 |
| −1 | 0 | 12 |
| −1 | −1 | 13 | the context of the sign (plus or minus) is found and output as the results of the bit modeling processing.

In a next step S213, the sign (plus or minus) is found from the transform coefficient read out from the previous step S208 to output the results as being the results of the bit modeling processing.

In a step S214, the sign (plus or minus) as found from the target coefficients is written in the current bit of the plus/minus sign memory.

Similarly, "1" (indicative of being significant) is written in a step S215 in the data corresponding to the current bit of the significance information memory.

Similarly, "1" (indicative of being significant) is written in a step S216 in the processed memory.

FIG. 17 is a flowchart showing the processing of the MAG pass, and shows the detailed operation of the step S106 shown in FIG. 14.

A step S301 is a loop (iteration) in the vertical direction of the CB size, with an increment being 4. Thus, if the vertical size of the CB size is 64 pixels, a loop counter (not shown) is counted up 0, 4, 8, 16, . . . .

A step S302 is a loop (iteration) in the horizontal direction of the CB size. The loop count value of the step S302 is the horizontal coordinate of the processing coefficients.

A step S303 is a loop (iteration) of the vertical four coefficients. The loop count value of step S301 and the count value of the step S303, combined together, become the vertical coordinate of the processing coefficient.

In a step S304, in accordance with addresses calculated from the vertical and horizontal coordinates specified by the loop counters of steps S301 to S303, the significance information of the current bit is read from the significance information memory and the processed information of the current bit is read from the processed memory.

In steps S305 to S306, if the current coefficient is insignificant, or if "1" (indicating 'processed') is set in the processed information, following steps S307 to S312 are skipped.

In a step S307, the significance information of the eight surrounding pixels of the current bit is read. In a step S308, from a MAG context model of the eight surrounding pixels, shown in the following table 3:

TABLE 3

| Sum of contribution of eight neighbors | Refinement information | Context value (output value) |
|---|---|---|
| any number except 0 | 1 | 16 |
| | 0 | 15 |
| 0 | 0 | 14 | the context of the target bit is obtained and output as a result of the bit processing modeling.

In a step S309, the transform coefficients are read from the transform coefficient storage memory and, in a step S310, the sign (plus or minus) of the transform coefficient read is also output as a result of the bit modeling processing.

In a step S311, "1" (indicating 'refined') is written in data corresponding to the current bit in the refinement information memory.

Similarly, in a step S312, "1" (indicating 'processed') is written in the processed memory.

FIGS. 18 to 21 depict flowcharts showing the processing of the CLN pass and illustrate a detailed operation of the step S107 shown in FIG. 16.

A step S401 is a loop (iteration) in the vertical direction of the CB size, with an increment being 4. Thus, if the vertical size of the CB size is 64 pixels, a loop counter (not shown) is counted up 0, 4, 8, 16, . . . .

A step S402 is a loop in the horizontal direction of the CB size, with the count value becoming the horizontal coordinate of the coefficient being processed.

In a step S403, the significance information of respective current bits of the vertical four coefficients and the eight neighbor pixels are read from the significance information memory, in accordance with the addresses calculated from the vertical and horizontal coordinates indicated by loop counters (not shown) of steps S401 and S402.

Similarly, in a step S404, the processed information of the vertical four coefficients is read from the processed information memory.

If, in a step S405, the processed information of the four vertical coefficients is all "0", and the significance information of the eight neighbors of the current bits of the four vertical coefficients is all insignificant, the processing as from step S408 is carried out. If otherwise, processing transfers to a step S406.

In the step S406, the number of processing loop iteration of a step S407 is set to 4. This indicates that the processing similar to the SIG pass processing is carried out for all of the vertical four coefficients.

In a step S407, the context values are generated. The detailed flowchart of FIGS. 20 and 21 show the detailed operation.

In a step S408, if the current bits of the vertical four coefficients are all "0", then the processing as from step S413 is carried out. If otherwise, the processing of a step S409 is carried out.

In a step S409, one of the current bits of the vertical four coefficients is "1", so that the context specifying that not all of the current bits of the vertical four coefficients are "0" is first output and, in the next step S410, a codeword "1" is output.

In the next step S411, a run length representing the positions of "1" of the vertical four coefficients by a numerical figure of from 0 to 3 is found.

In the next step S412, the context of the run length and the code for the run length composed of two bits is output.

In a step S413, where all of the vertical four coefficients are "0", a context specifying this is output. A codeword "0" is output in a step S414.

The detailed flowchart of FIGS. 20 and 21 is now explained.

A step S415 is a loop (iteration) of a (4-run length) number of times. More specifically, when the processed information of the vertical four coefficients, representing the condition of the step S405, is all "0" and not all of the significance information of eight neighbors of the current bits of the vertical four coefficients are insignificant, four number of iterations are carried out.

If the run length is found in the steps S409 ff., one of the current bits is "1". Thus, in order to encode the vertical current bits as from the time of the occurrence of the "1", a number of times equal to (4-run length) of iterations is carried out.

In the next step S416, the leading end of the run is checked. This check is that as to whether or not, when one of the current bits of the vertical four coefficients is "1", the current bit has become "1" for the first time. If the bit in question is the leading end bit, a step S417 is executed and, if otherwise, a step S423 is executed.

If the bit in question is the leading end of the run, the information on the sign (plus or minus) of the eight neighbors of the current bit is read out in the step S417 from the plus/minus sign memory.

In the next step S418, the context value is found from the context model shown in the Table 2 and output as a result of the bit modeling processing.

In the next step S419, the sign (plus or minus) of the target coefficient is read from the memory for storage of the transform coefficients. In a step S420, the sign (plus or minus) is also output as the results of the bit model processing.

In a step S421, the sign (plus or minus) as found from the target coefficient is written in the current bit of the plus/minus sign memory.

Similarly, in a step S422, "1" (indicating being significant) is written in a significance information memory as well.

In the next step S424, the context value is found from the context model shown in the Table 1 and output as a result of the bit model processing.

In the next step S425, the transform coefficient is read from the transform coefficient storage memory and, in a step S426, the sign of the transform coefficient is also output as a result of the bit model processing.

If, in a step S427, the current bit is "0", the steps S428 to S432 are skipped.

If the current bit is "1", it is found that the transform coefficient is different from 0. Thus, in the next step S428, the sign (plus or minus) information of the eight surrounding bits of the current bit is read from the plus/minus sign memory.

In a step S429, the context value is found from the context model shown in the Table 2 and output as a result of the bit modeling processing. In a step S430, the sign (plus or minus) is similarly output as a result of the bit modeling processing.

In a step S431, the sign (plus or minus) as found from the current coefficient is written in the current bit of the plus/minus sign memory. Similarly, in a step S432, "1" (indicating being significant) is written in the significance information memory.

The structure of the conventional multi-level image encoding/decoding apparatus and the memory accessing operation thereof are hereinafter explained.

First Conventional Art

FIG. 22 is a block diagram showing the structure of a first conventional art of a multi-level image encoding/decoding apparatus and FIG. 23 shows a memory structure of the first conventional art.

The multi-level image encoding/decoding apparatus of the conventional art includes a transform coefficient storage memory 1, a significance information memory 2, a plus/minus sign memory 3, a processed information memory 4, a refinement information memory 5, a bit modeling unit 6, and an arithmetic encoder 7, as shown in FIG. 22. The bit modeling unit 6 includes an address generator 100.

FIG. 23A shows a memory map of each memory and FIG. 23B shows an array on the code block of the information of each memory.

The transform coefficient storage memory 1 stores the transform coefficients of the result of wavelet transform. The significance information memory 2 stores the information as to the sign (plus or minus) of the transform coefficient. The plus/minus sign memory 3 stores the sign (plus or minus) information of the transform coefficient. The processed information memory 4 stores the information as to whether or not the transform coefficient has been processed with bit modeling. The refinement information memory 5 stores the information indicating whether or not the processing of the MAG pass of the transform coefficients has come to a close.

Using the addresses of the vertical and horizontal coordinates of the bit modeling processing, generated in the address generator 100, the bit modeling unit 6 performs bit modeling processing on the information read by accessing each memory to output the information of the result of the processing (context (CX) and sign). Using the information of the processing result (context and sign) of the bit modeling unit 6, the arithmetic encoder 7 generates and outputs the compressed image information.

Using data of the bit length equal to the code block size from the significance information memory 2, plus/minus sign memory 3, processed information memory 4 and the refinement information memory 5, the bit modeling unit 6 performs bit modeling processing on the transform coefficient from the transform coefficient storage memory 1.

More specifically, a 1 bit×4096 word memory is required, solely for the significance information, in case the code block size is of 64×64=4096 (=1000h), as shown in FIG. 23. However, since the memory of the same information quantity is needed for each of the significance information memory 2, plus/minus sign memory 3, processed information memory 4 and the refinement information memory 5, four memories each being of 4096 words×1 bit are required for the apparatus in its entirety. Moreover, a 64×64×(bit precision length of the transform coefficient) is required for the transform coefficient storage memory 1.

In this case, in calculating the context of the SIG pass processing, shown in the flowchart of FIGS. 15 and 16, nine read accesses in the step S204, one read access in the step S208, eight read accesses in the step S211, one write access in the step S214, one write access in the step S215, and one write access in the step S216, are required, so that, in the SIG pass processing, 21 accesses at the maximum are required.

Similarly, in the MAG pass processing, shown in the flowchart of FIG. 17, one read access in the step S304, eight read accesses in the step S307, one read access in the step S309, one write access in the step S311 and one write access in the step S312, are required, so that 12 accesses operations at the maximum are required for the MAG pass processing.

Although the detailed explanation is omitted for the CLN pass processing, 8 memory accesses at the maximum are required for obtaining the information of the eight neighbor pixels in the memory structure shown in FIG. 23.

Second Conventional Art

FIG. 24 is a block diagram showing the structure of a second conventional art of a multi-level image encoding/decoding apparatus, and FIG. 25 shows a memory map of the second conventional art.

The multi-level image encoding/decoding apparatus of this conventional art includes a transform coefficient storage memory 1, a bit modeling unit 6, an arithmetic encoder 7 and a memory for variety of information 8, as shown in FIG. 24.

Of these, the transform coefficient storage memory 1 and the arithmetic encoder 7 are the same as those of the first conventional art shown in FIG. 22.

The memory for a variety of information 8 includes, in one 20-bit word, the significance information 25-1 of eight neighbors, the significance information 25-2 of the current bit, the sign (plus and minus) 25-3 of eight neighbors, the sign (plus and minus) 25-4 of the current bit, the refinement information 25-5 and the processed information 25-6.

The processing in the bit modeling unit 6, shown in FIG. 24, employing the memory for a variety of information 8, shown in FIG. 25, is the processing executed in a program (JASPER version 1.500.3 in WEB site: http://www.ece.ub-c.ca/-mdadams/jasper/ stated in the C language for recognition of the JPEG 2000 operation, termed JASPER.

SUMMARY OF THE DISCLOSURE

In the JPEG2000 system, since the encoding and decoding are performed on the bit plane basis, as shown in FIG. 10, the processing time is increased as compared to that with the JPEG system, so that, if compression/decompression of for example moving pictures for near future is taken into account, speedup of the bit modeling processing becomes a crucial task.

On the other hand, if the JPEG2000 system is used for the small-sized equipment, such as a digital camera, the relatively small amount of memory consumption is necessary in the perspective of reducing the circuit size.

With the first conventional art for the JPEG2000 system, the amount of memory consumption is small but the time for bit model processing is long, whereas, with the second conventional art, the amount or memory consumption is large, even though the time for bit model processing is short.

In the first conventional art, sown in FIG. 22, the significance information memory 2, plus/minus sign memory 3, processed information memory 4 and the refinement information memory 5 are all of the same size. Thus, the necessary memory volume is 64*64*4=16384 bits, while that of the transform coefficient memory is 64*64*16=65536 bits, which represents the necessary minimum value. However, as shown in FIGS. 14 to 16, a large number of memory access operations are produced in finding the context, thus protracting the processing time.

The reason these problems are raised is now explained, using the flowchart of FIGS. 15 and 16 which are flowcharts showing the processing sequence of the SIG pass.

In finding the context of the SIG pass in these flowcharts, nine memory accesses first occur in a step S204 by the "significance information of the current bit and the eight neighbors". Using this significance information, it is checked whether or not the processing pass is the SIG pass. This memory accessing has to be performed even when the processing is not being made in the SIG pass.

In the next step S205, it is checked whether or not the target coefficient is insignificant. In a step S206, it is checked as to whether or not one of the eight neighbors is significant. When both decisions hold good, the pass is determined to be the SIG pass. In a step S208, one memory accessing operation is carried out to read out the transform coefficient from the transform coefficient storage memory 1. If the transform coefficient read is in need of the sign (plus or minus), eight memory access operations are carried out in a step S211 on the sign (plus or minus) of the eight neighbors.

For finally updating the information, one memory access is carried out on the sign (plus or minus) information, significance information and on the processed information, so that a sum total of three memory accesses are generated.

Thus, if the pass is the SIG pass, 21 memory access operations are produced. If the pass is not the SIG pass, nine memory access operations are produced. This accounts for the prolonged processing time in the bit modeling processing in which the processing is carried out on the bit basis.

In the second conventional art, the necessary information is acquired with one memory access operation by having the necessary information stored in its entirety in one memory word, thus decreasing the number of times of the memory access operations. However, the amount of memory consumption is increased. This is explained by referring to the flowchart of FIGS. 15 and 16.

In the second conventional art, one readout accessing operation in the step S204, one read access in the step S208 and one read access in the step S211 are carried out. However, in distinction from the first conventional art, a sum total of nine write accesses are carried out for accessing the plus/minus sign memory of the current bit and eight neighbors, nine write accesses are similarly carried out in the step S215 and finally one write access is needed in the step S216, so that a sum total of 21 memory accesses at the maximum are needed in the SIG pass processing.

Thus, in the second conventional art, the maximum number of the memory access operations is similar to that of the first conventional art. However, one memory access suffices for determining whether or not the pass is the SIG pass (step S204), thus reducing the overall number of times of the memory accessing.

For example, in a 64×64 code block, of which one half belongs to the SIG pass, the first conventional art is in need of the 64*64*21=86016 memory accesses at the maximum, whereas the second conventional art is in need of 64*64*21*0.5+64*64*1*0.5=45056 memory accesses, which account for about one half of the number of the memory accesses in the first conventional art.

However, if a current bit of an optional coordinate is considered, the significance information, sign (plus or minus), processed information and the refinement information of the current bit and eight neighbors are stored in the same one word.

If a location one coefficient below the current bit is considered, the necessary information is again the significance information, sign (plus or minus) information, processed information and the refinement information of the current bit and eight neighbors. The information of the eight neighbors of the bit one coefficient below an arbitrary coordinate includes the significance information and the sign (plus or minus) information of the arbitrary coordinate. Similarly, eight neighbors of an arbitrary coordinate include the significance information and the sign (plus or minus) information one coefficient below the arbitrary coordinate.

This means that the same information needs to be stored in different addresses, thus increasing the amount of memory consumption.

More specifically, with a codebook size of 64×64, a sum total of 20 bits for the significance information 25-2, the significance information 25-1 for the eight neighbors, sign (plus or minus) 25-4 of the current bit, sign (plus or minus) 25-3 of the eight neighbors, refinement information 25-5 and the processed information 25-6, are required in one word of the memory for variety of information 8. Thus, 64*64*20 bits, that is a sum total of 81920 bits, are required for one code block. The transform coefficient storage memory 1 sores 64*64*16=65536 bits, as in the first conventional art.

Thus, in this second conventional art, the amount of the memory consumption is 147456 its, which is 1.8 times 81920 bits for the first conventional art.

Accordingly, it is an object of the present invention to provide a multi-level image encoding/decoding apparatus in which, in the application of the JPEG2000 system, it is possible to shorten the processing time for bit modeling and to diminish the amount of memory consumption.

The above and other objects are attained by a multi-level image encoding/decoding apparatus, in accordance with one aspect of the present invention, for performing bit modeling processing on coefficients, which are the results of wavelet transform of a multi-level image read out from a transform coefficient storage memory, by accessing a significance information memory, a plus/minus sign memory, a processed information memory and a refinement information memory, in which the apparatus includes first address generating means for generating an address for accessing the processed information memory and the refinement information memory, and second address generating means for generating an address for accessing the significance information memory and the plus/minus sign memory.

In a multi-level image encoding/decoding apparatus, in accordance with one aspect of the present invention, the significance information memory, plus/minus sign memory, processed information memory and the refinement information memory are of the same memory size.

In a multi-level image encoding/decoding apparatus, in accordance with one aspect of the present invention, processing of each stage in the bit modeling processing is carried out by one access operation from the first address generating means, by storing said transform coefficients with each four vertical coefficients located on a bit plane as one word in the processed information memory and in the refinement information memory; and wherein processing of each stage in said bit modeling processing is carried out by two access operations from said second address generating means, by storing information of eight neighbors of the four vertical coefficients in a word in said significance information memory and in said plus/minus sign memory with shifting of said vertical coordinates.

In a multi-level image encoding/decoding apparatus, in accordance with one aspect of the present invention, in the significance information and in the plus/minus sign memory, the vertical coordinates of the four vertical coefficients are shifted by +2.

In a multi-level image encoding/decoding apparatus, in accordance with one aspect of the present invention, in the significance information and in the plus/minus sign memory, one word is formed by a number of coefficients equal to multiples of four.

In a multi-level image encoding/decoding apparatus, in accordance with one aspect of the present invention, the information corresponding to N times four bits of each of the significance memory and the plus/minus sign memory are collected and stored in one word to form a significance information—sign (plus or minus) information memory, and/or the information corresponding to N times four bits of each of the processed information memory and the refinement memory, N being a natural number, are collected and stored in one word to form a processed information—refinement information memory so that access may be made to the significance information—sign (plus or minus) information and/or the processed information—refinement information.

In a multi-level image encoding/decoding apparatus, in accordance with one aspect of the present invention, a cache register is provided to each of the significance memory, plus/minus sign memory, processed information memory and the refinement information memory and the information obtained on previous accessing to the respective memories is stored in the associated cache registers so as to be usable in subsequent processing operations.

Still other objects and advantages of the present invention will become readily apparent to those skilled in this art from the following detailed description in conjunction with the accompanying drawings wherein only the preferred embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIGS. 2A and 2B depict a memory map of the processed information and the refinement information in the multi-level image encoding/decoding apparatus shown in FIG. 1.

PREFERRED EMBODIMENTS OF THE INVENTION

Figure 1:
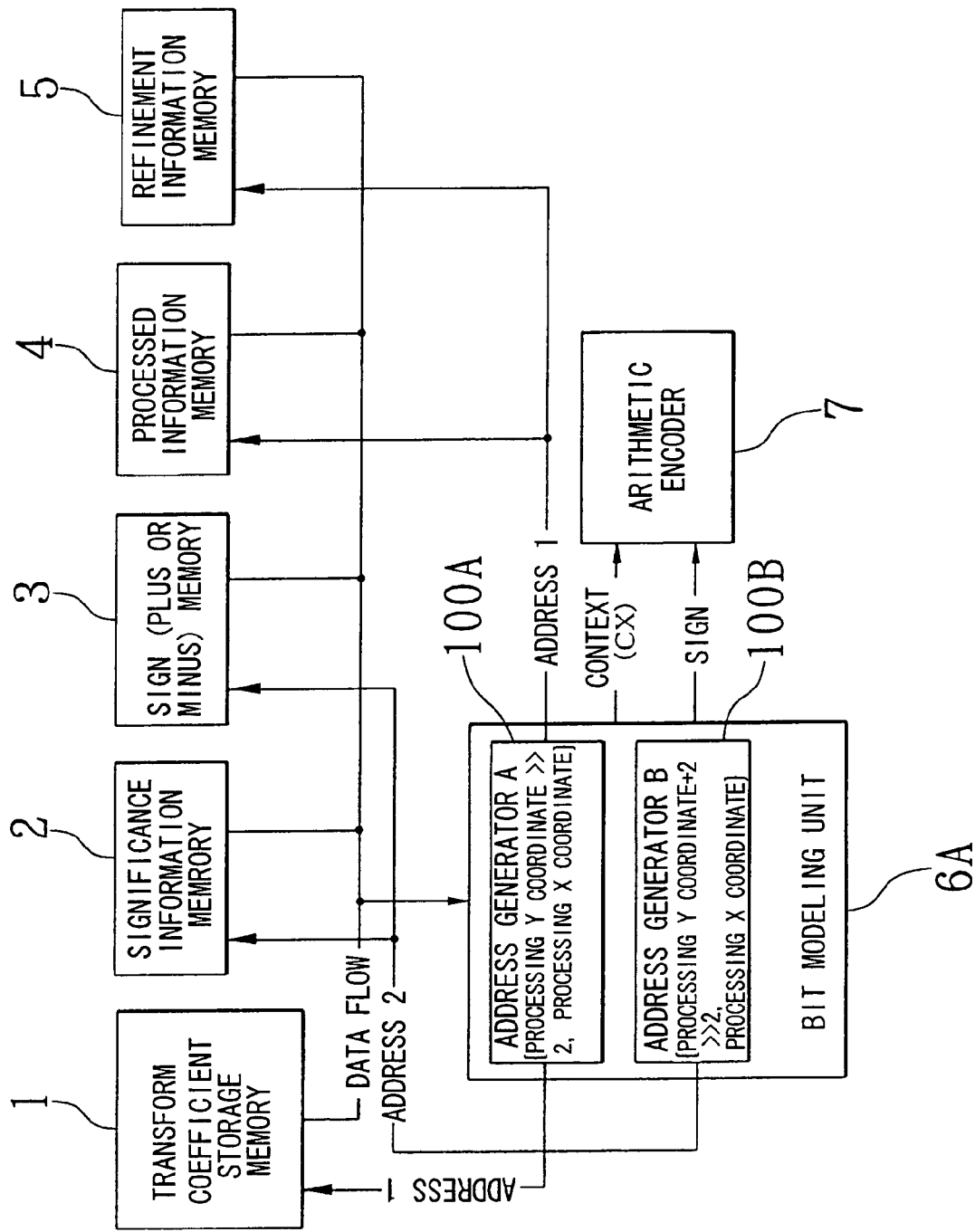
FIG. 1 is a block diagram showing the structure of a multi-level image encoding/decoding apparatus according to a first embodiment of the present invention.

Referring to the drawings, certain preferred embodiments of the present invention will be explained in detail.

First Embodiment

FIG. 1 is a block diagram showing the structure of a multi-level image encoding/decoding apparatus of a first embodiment of the present invention. FIG. 2 depicts a memory map of the processed information and the refinement information in the first embodiment of the multi-level image encoding/decoding apparatus. FIG. 3 depicts a memory map of the 'processed' information and the sign (plus or minus) information in the multi-level image encoding/decoding apparatus of the first embodiment. FIG. 4 depicts memory access of the four vertical coefficients plus the eight neighbors in the multi-level image encoding/decoding apparatus of the first embodiment.

Figure 22:
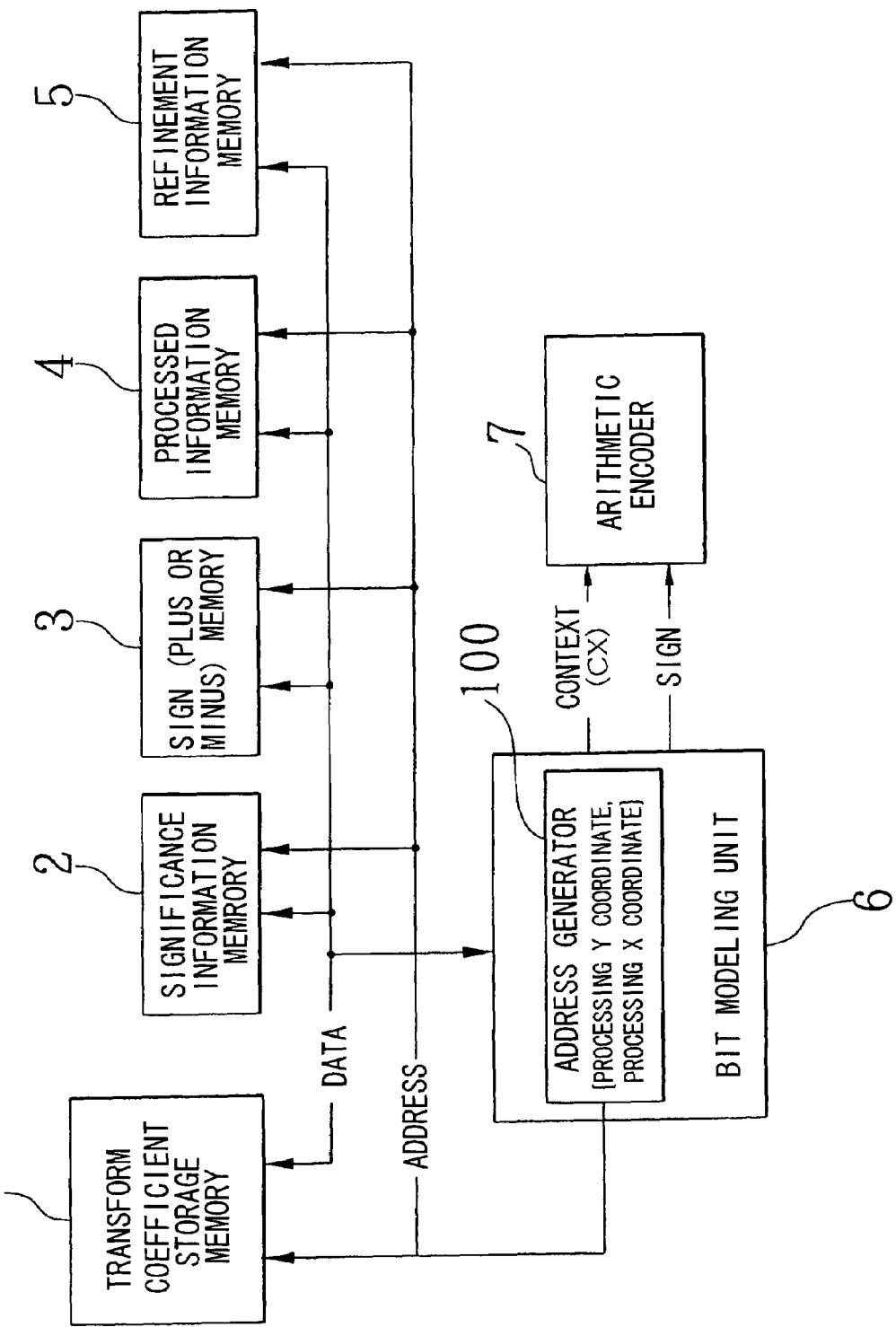
FIG. 22 is a block diagram showing the structure of a multi-level image encoding/decoding apparatus according to a first conventional art.
Figure 23B:
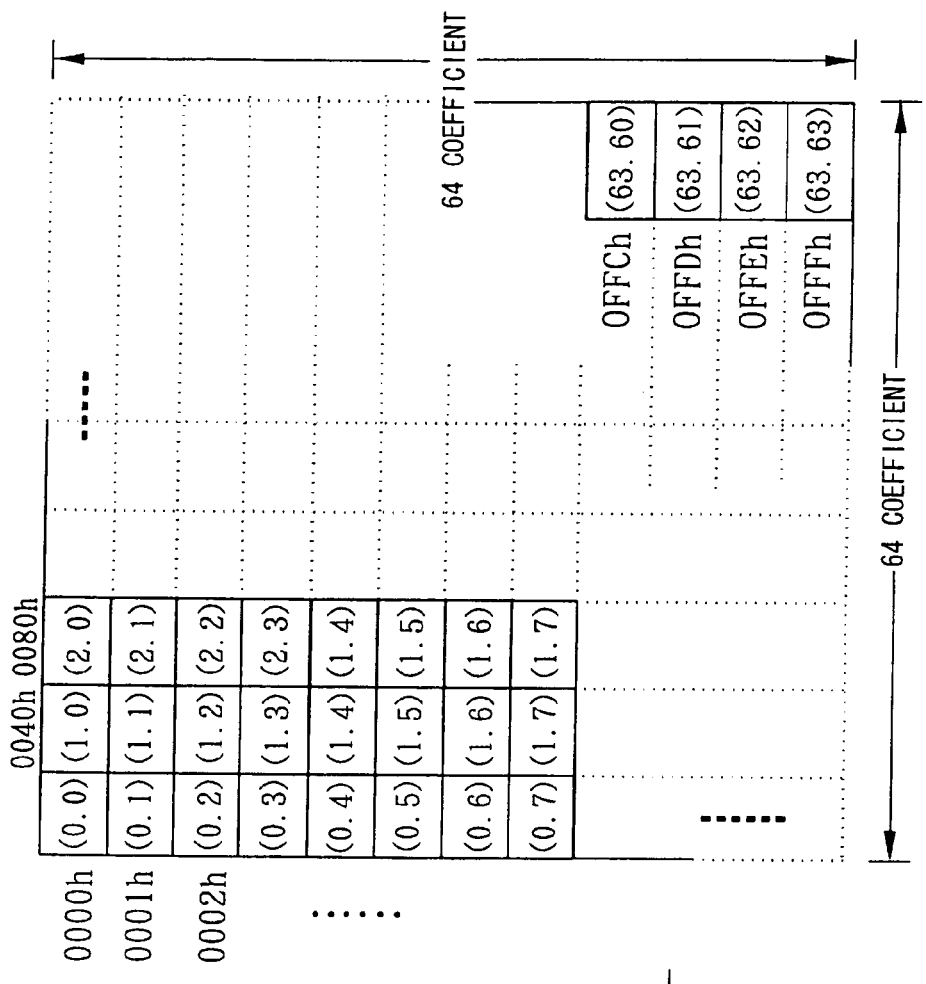
FIGS. 23A and 23B show a memory structure of the first conventional art.
Figure 23A:
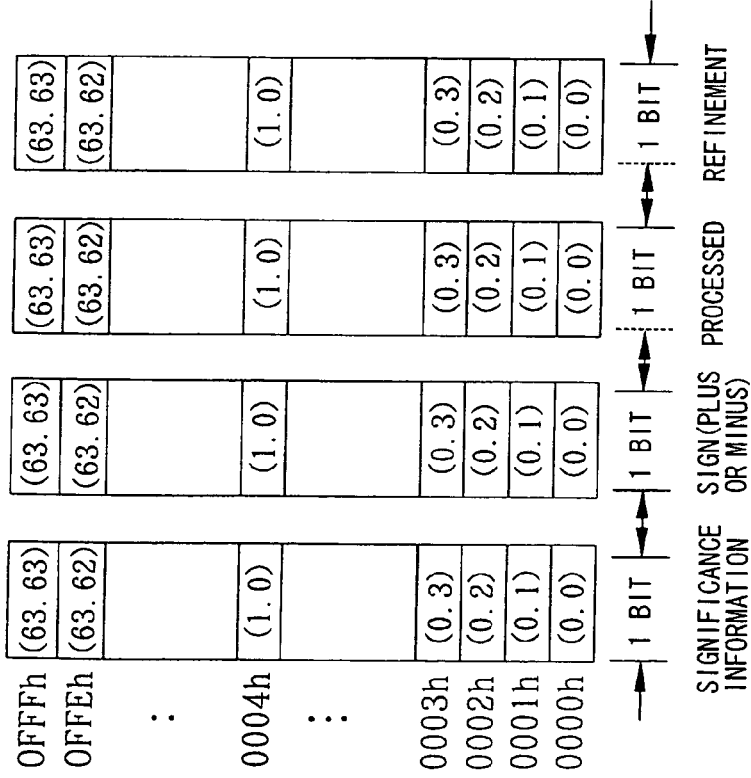
Figure 24:
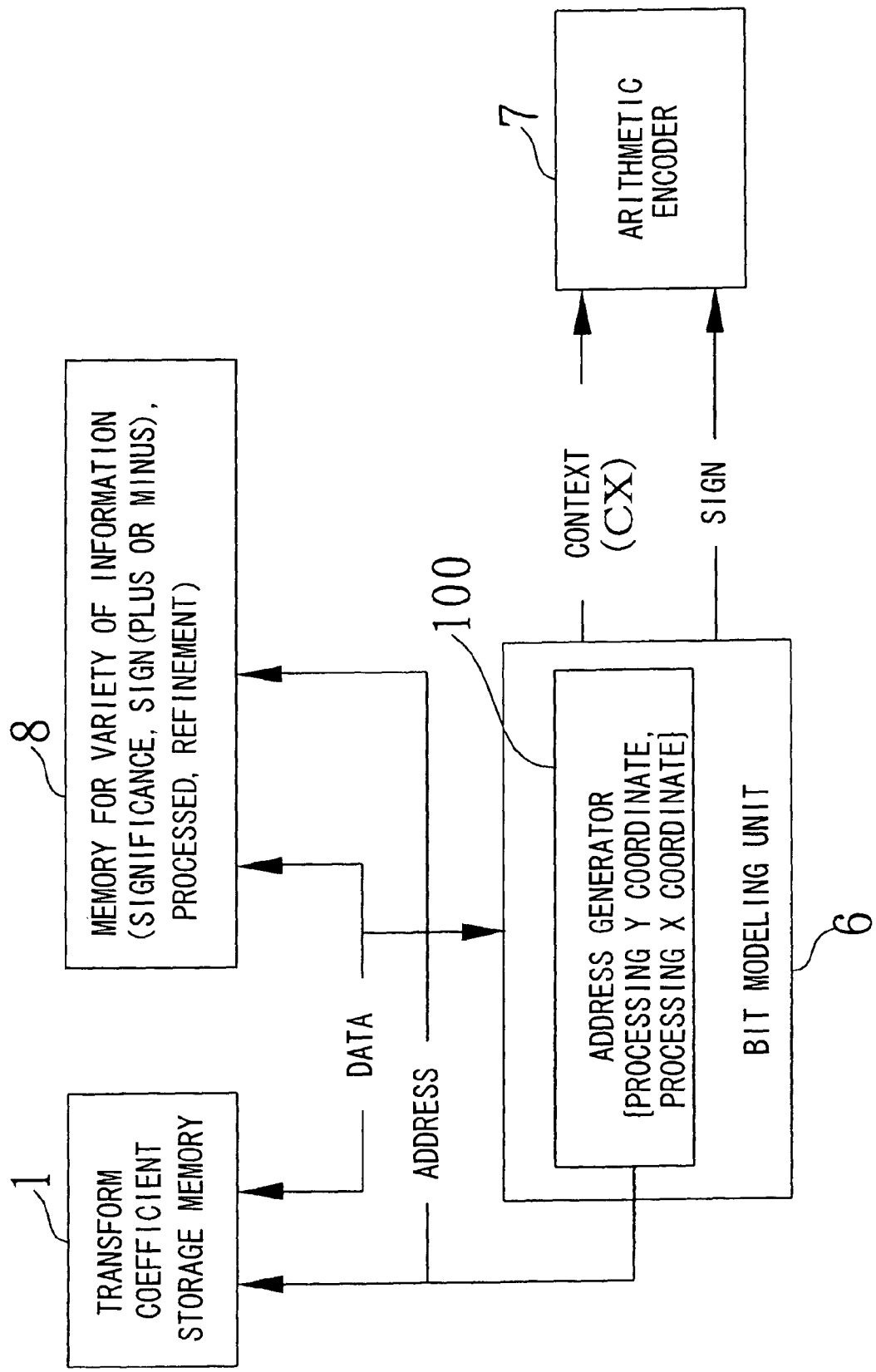
FIG. 24 is a block diagram showing the structure of a multi-level image encoding/decoding apparatus according to a second conventional art.
Figure 25:
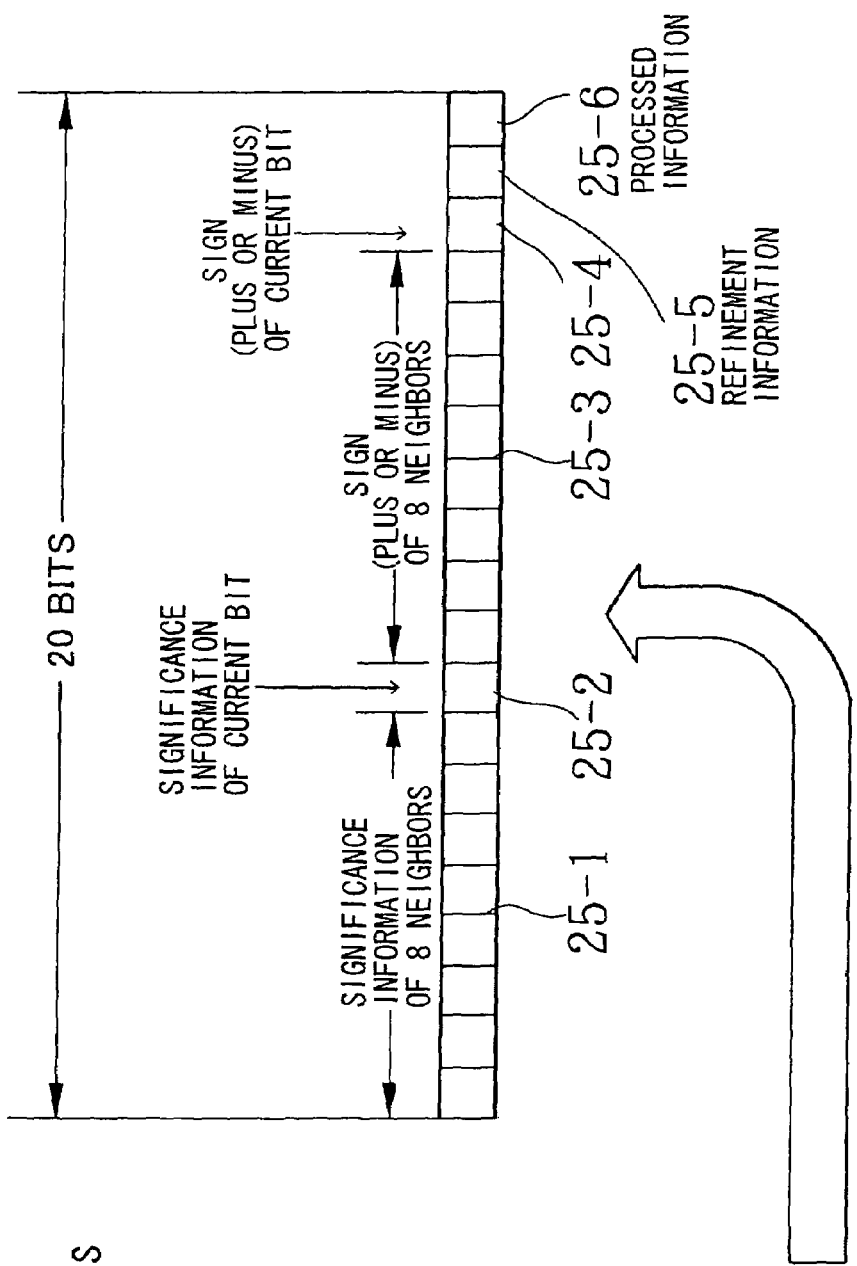
FIG. 25 shows a memory map in the second conventional art.

The multi-level image encoding/decoding apparatus of the present embodiment comprises a transform coefficient storage memory 1, a significance information memory 2, a plus/minus sign memory 3, a processed information memory 4, a refinement information memory 5, a bit modeling unit 6A and an arithmetic encoder 7. The transform coefficient storage memory 1, significance information memory 2, plus/minus sign memory 3, processed information memory 4, refinement information memory 5 and the arithmetic encoder 7 are similar to those of the first conventional art shown in FIG. 22.

The bit modeling unit 6A includes a first address generating unit 100A and a second address generating unit 100B.

Using the address of the vertical coordinate and the address of the horizontal coordinate of the bit modeling processing, generated in the address generating units 100A and 100B, the bit modeling unit 6A accesses the respective memories and performs bit modeling processing on the read-out information to output the information of the result of processing (context (CX) and the sign).

The address generator 100A is a circuit block for generating the addresses of the processed information memory 4 and the refinement information memory 5. This block collects the four coefficients into one word to allow accessing the information necessary for the four vertical coefficients by one memory access, as shown in FIG. 2. The address generator 100A generates an address of the transform coefficient storage memory 1 as well.

FIG. 2A shows a memory map of the processed information and the refinement information and FIG. 2B shows the arrangement of these information on a code block.

FIG. 2 illustrates the case for 64×64 coefficients. Thus, the range of the memory addresses is 0–3FFh (h designates a hexadecimal notation).

FIG. 2 shows that the processed information or the refinement information associated with the four vertical coefficients of the coordinates (0,0) to (0,3) has been stored in an address 000h of each memory, and that, in similar manner, the information from (63,60) to (63,63) has been stored in the address 3FFh.

The address generator 100B is a circuit block for generating addresses of the significance information memory 2 and the plus/minus sign memory 3, in need of the information of the eight neighbors of each of the four vertical coefficients. Referring to FIG. 3, the address generator is arranged so that, in storing the coefficients in the significance information memory 2 and the plus/minus sign memory 3, the vertical coordinate is shifted +2 to allow acquiring the information of the eight neighbors of each of the four vertical coefficients by two memory access operations.

Figure 3B:
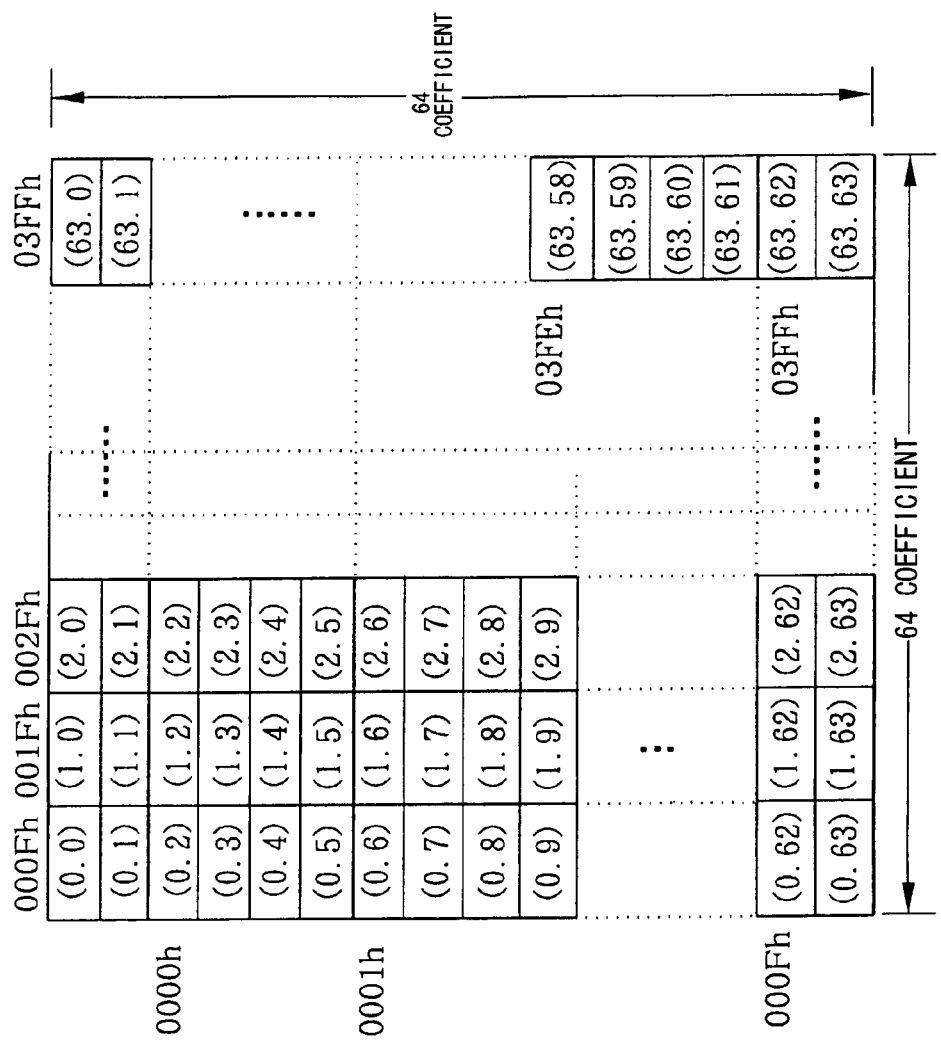
FIGS. 3A and 3B depict a memory map of the significance information and the sign (plus or minus) information in the multi-level image encoding/decoding apparatus shown in FIG. 1.
Figure 3A:
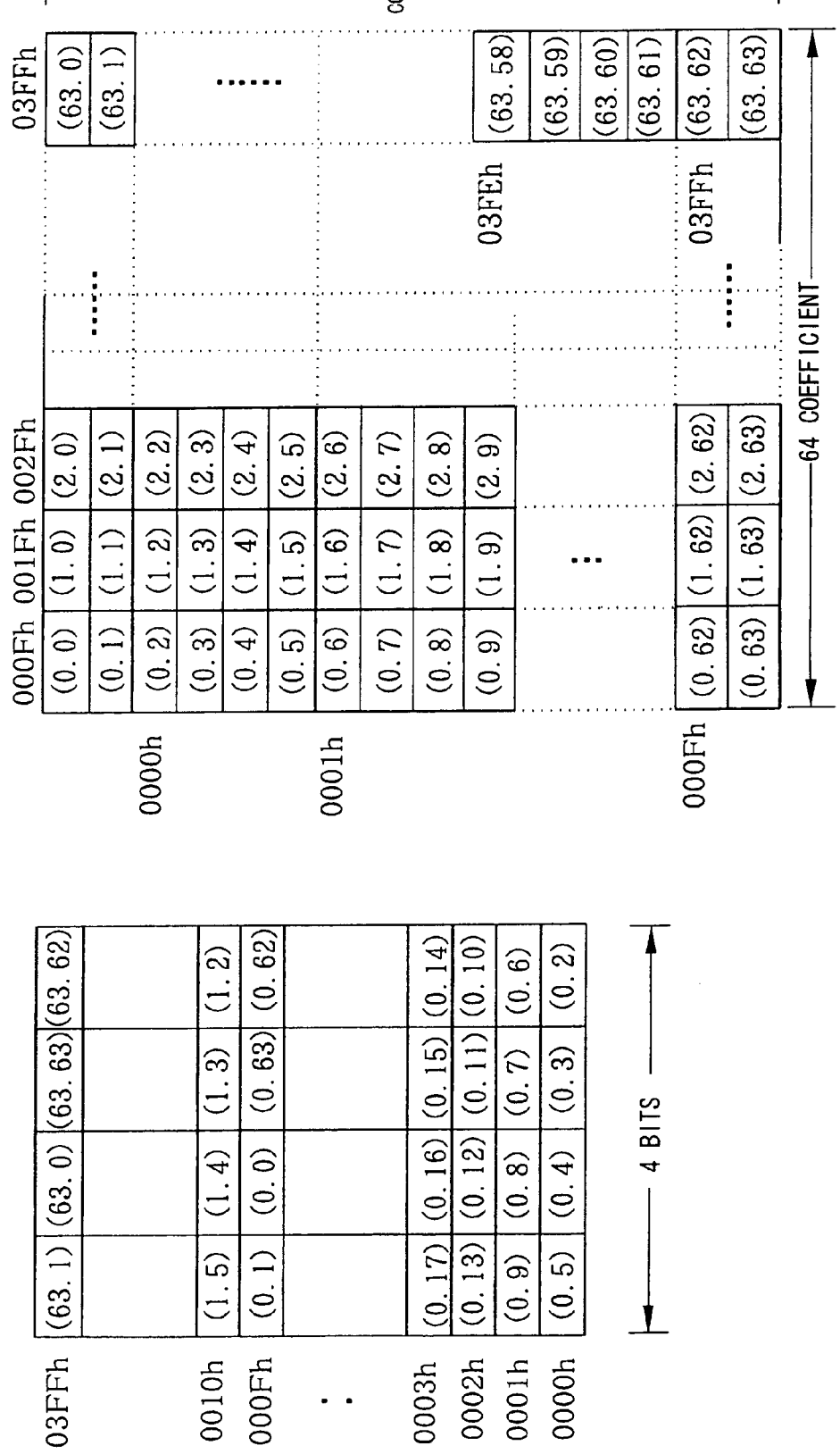
Figure 4:
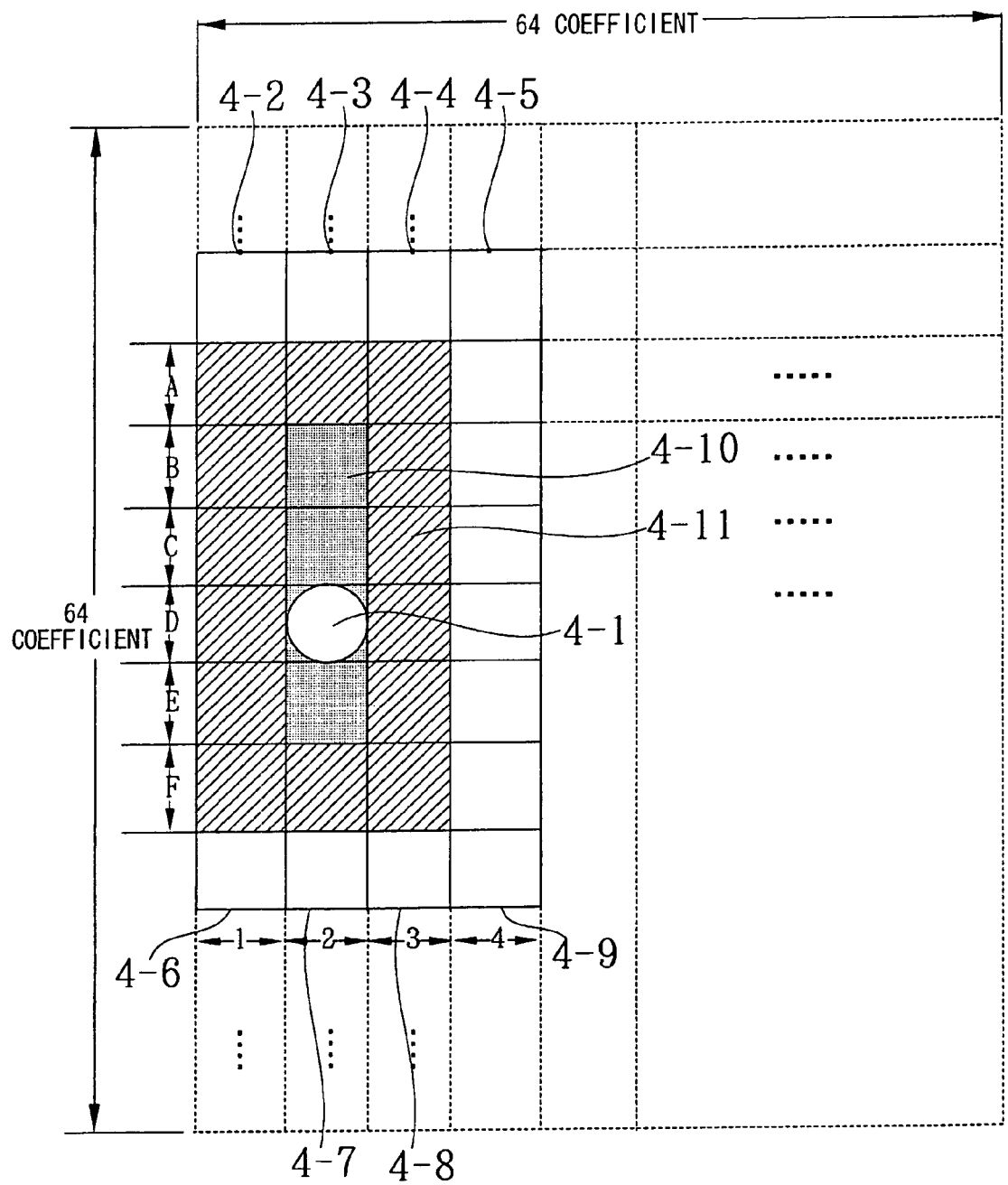
FIG. 4 depicts memory access to the four vertical coefficients and eight neighbors in the multi-level image encoding/decoding apparatus shown in FIG. 1.

FIG. 3A shows a memory map of the significance information and the sign (plus or minus) information and FIG. 3B shows the arrangement of these information on a code block.

FIG. 3 illustrates the case for 64×64 coefficients. Thus, the range of the memory addresses is 0–3FFh (hexadecimal notation).

FIG. 3 shows that the significance information or the sign (plus or minus) information, associated with the four vertical coefficients of the coordinates (0,2) to (0,5), is stored in an address 000h of each memory, while the information of (0,6) to (0,9), is stored in an address 001h of each memory. The information from (0,0)–(0,1) and the information (0,62)–(0,63) are stored in the address 03Fh. In similar manner, the information (63,58)–(63,61) is stored in an address 3FEh, while the information from (63,0)–(63,1), (63,62)–(63,63) is stored in the address 3FFh.

The operation of a first embodiment of the present invention is now explained.

As explained in connection with the conventional art, the information necessary in processing the three passes of the SIG pass, MAG pass and the CLN pass is the processed information and the refinement information of the coordinate being processed, and the significance information and the sign (plus or minus) information of the eight neighbors inclusive of the coordinate being processed.

Figure 12:
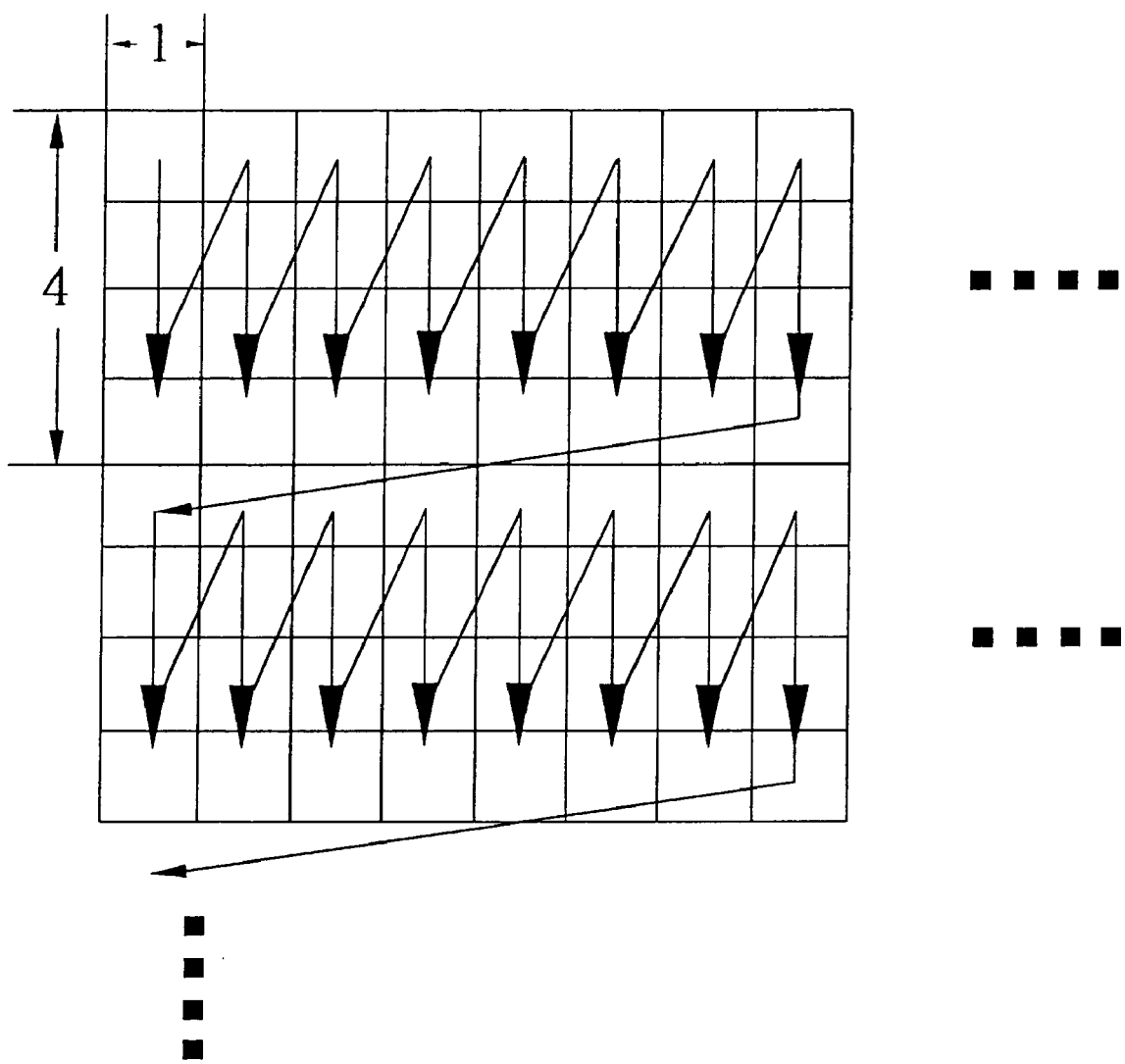
FIG. 12 shows a bit scanning sequence in a bit plane.
Figure 13:
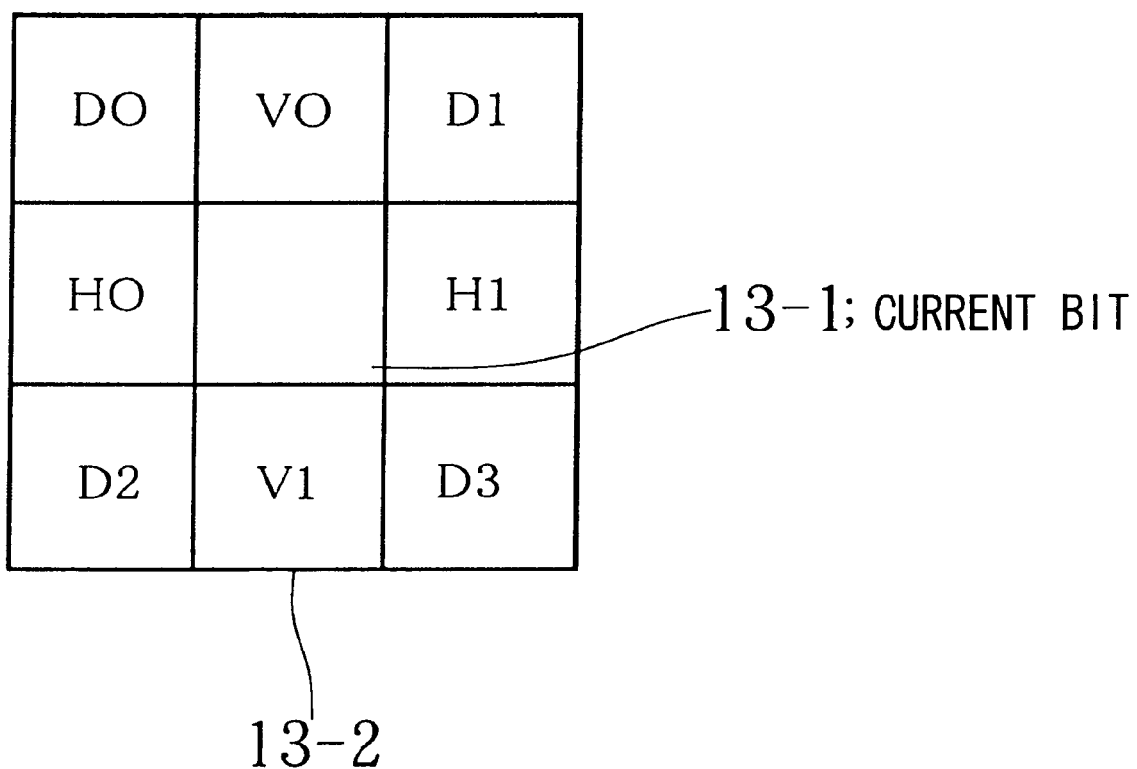
FIG. 13 depicts a context model of the eight neighbors.
Figure 14:
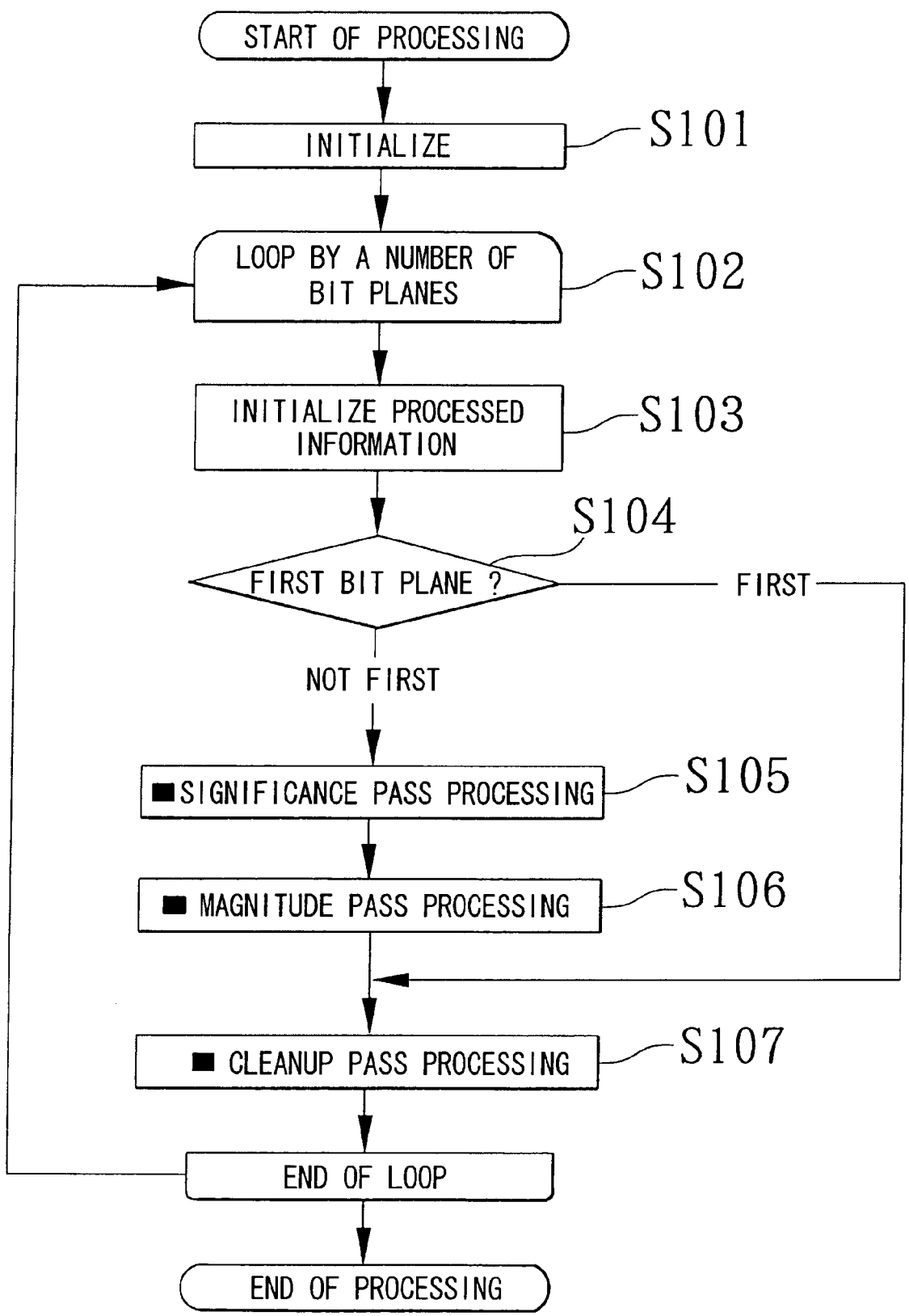
FIG. 14 is a flowchart showing the overall bit modeling processing.

The three-pass processing is the raster processing of the four vertical coefficients, as shown in FIG. 12, so that processing is executed in terms of the four vertical coefficients as a unit.

Referring to FIG. 2, the processed information and the refinement information may be acquired by one memory access by storing information of four vertical coefficients as a unit in one word of a memory.

Since the information of eight neighbors of the four vertical coefficients is required for the significance information and the sign (plus or minus) information, the necessary information may be acquired with a smaller number of times of memory accesses by storing the information in an address resulting from shifting the vertical coordinate by +2.

FIG. 4 illustrates the memory accesses for the four vertical coefficients plus eight neighbors, and specifically shows that the required information may be acquired by the memory accesses of a sum total of six words of 4-2, 4-3, 4-4, 4-6, 4-7 and 4-8 as shown.

With the present embodiment of the multi-level image encoding/decoding apparatus, in which the necessary information is collected in one word, it is possible to diminish the amount of memory accesses. In particular, in case the information of the eight neighbors inclusive of the coordinate being processed has become necessary, it may be expected to decrease the number of memory accesses.

Figure 9:
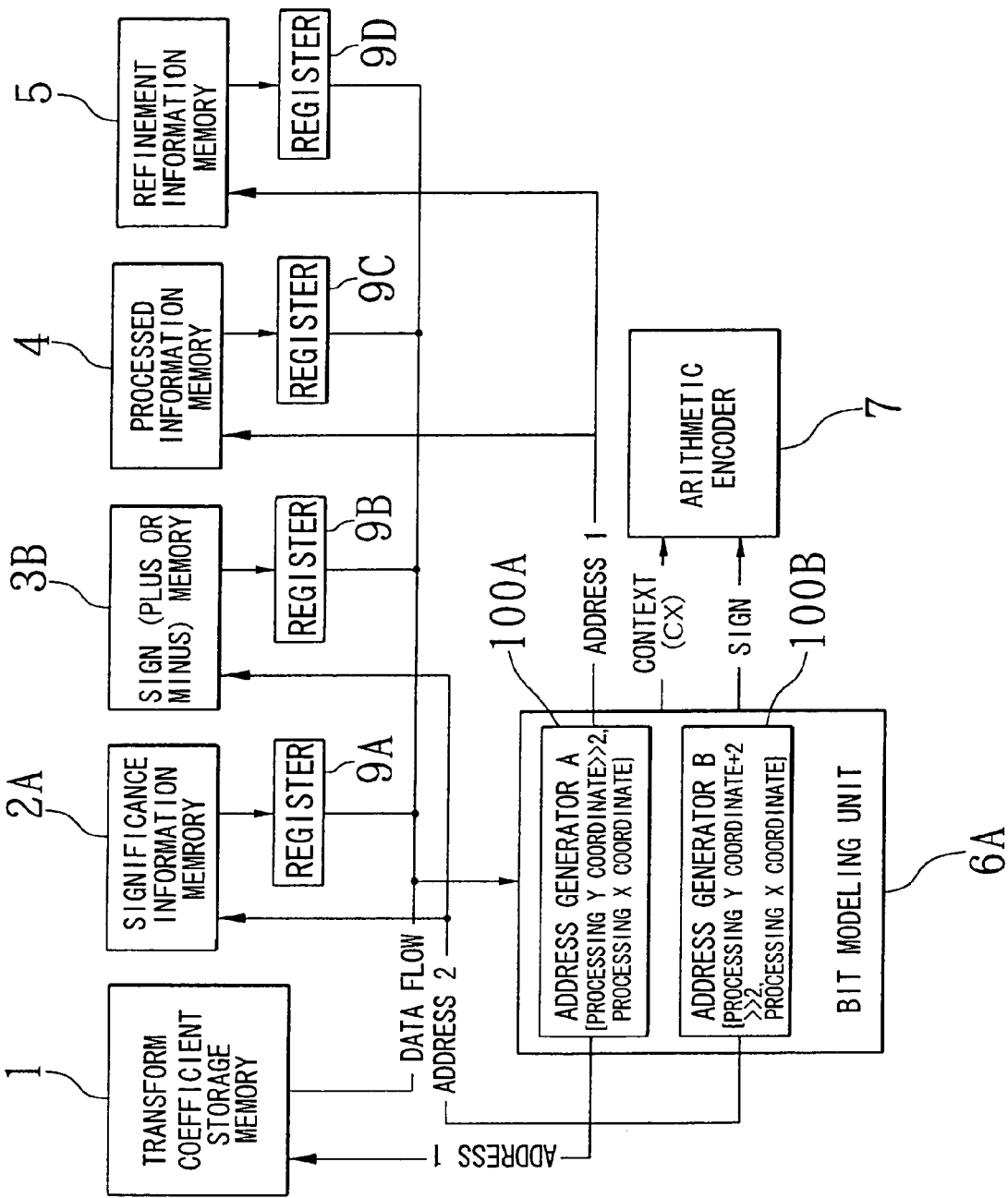
FIG. 9 is a block diagram showing the structure of a multi-level image encoding/decoding apparatus according to a fifth embodiment of the present invention.
Figure 10:
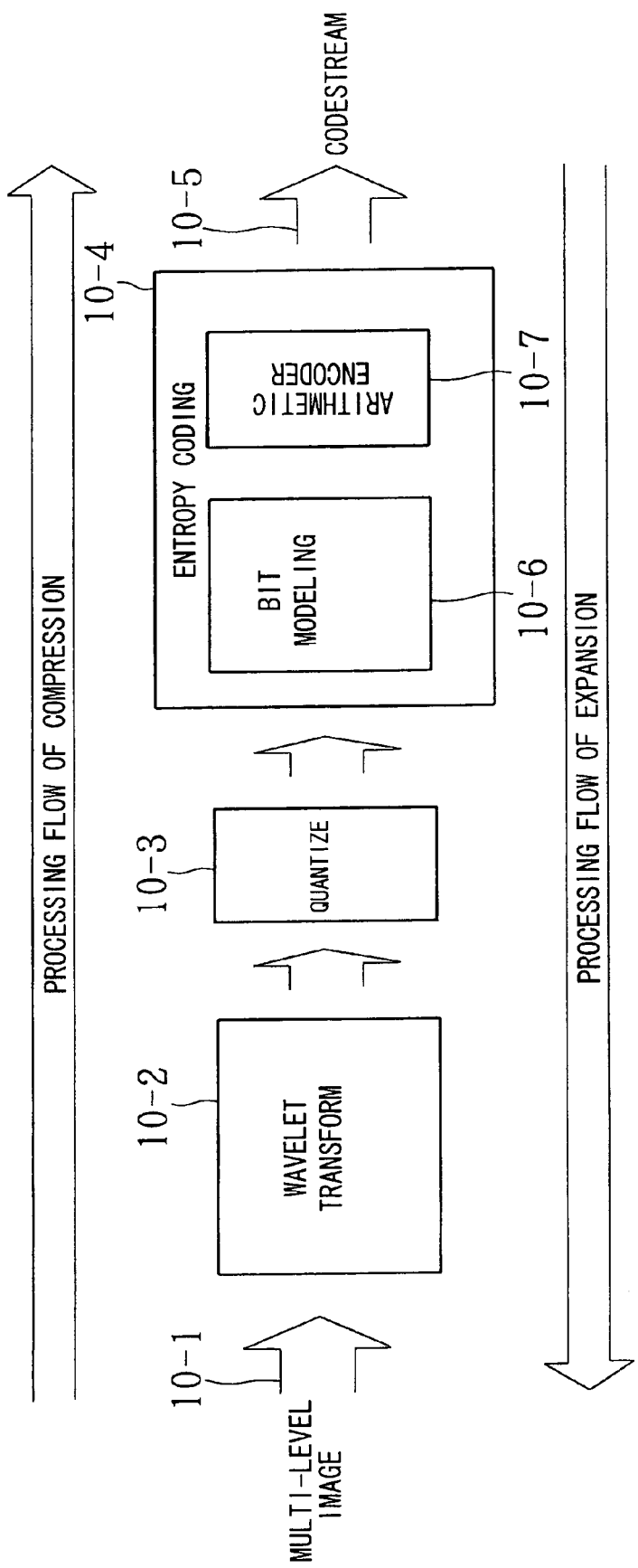
FIG. 10 shows the overall processing flow of the JPEG2000 system.
Figure 11:
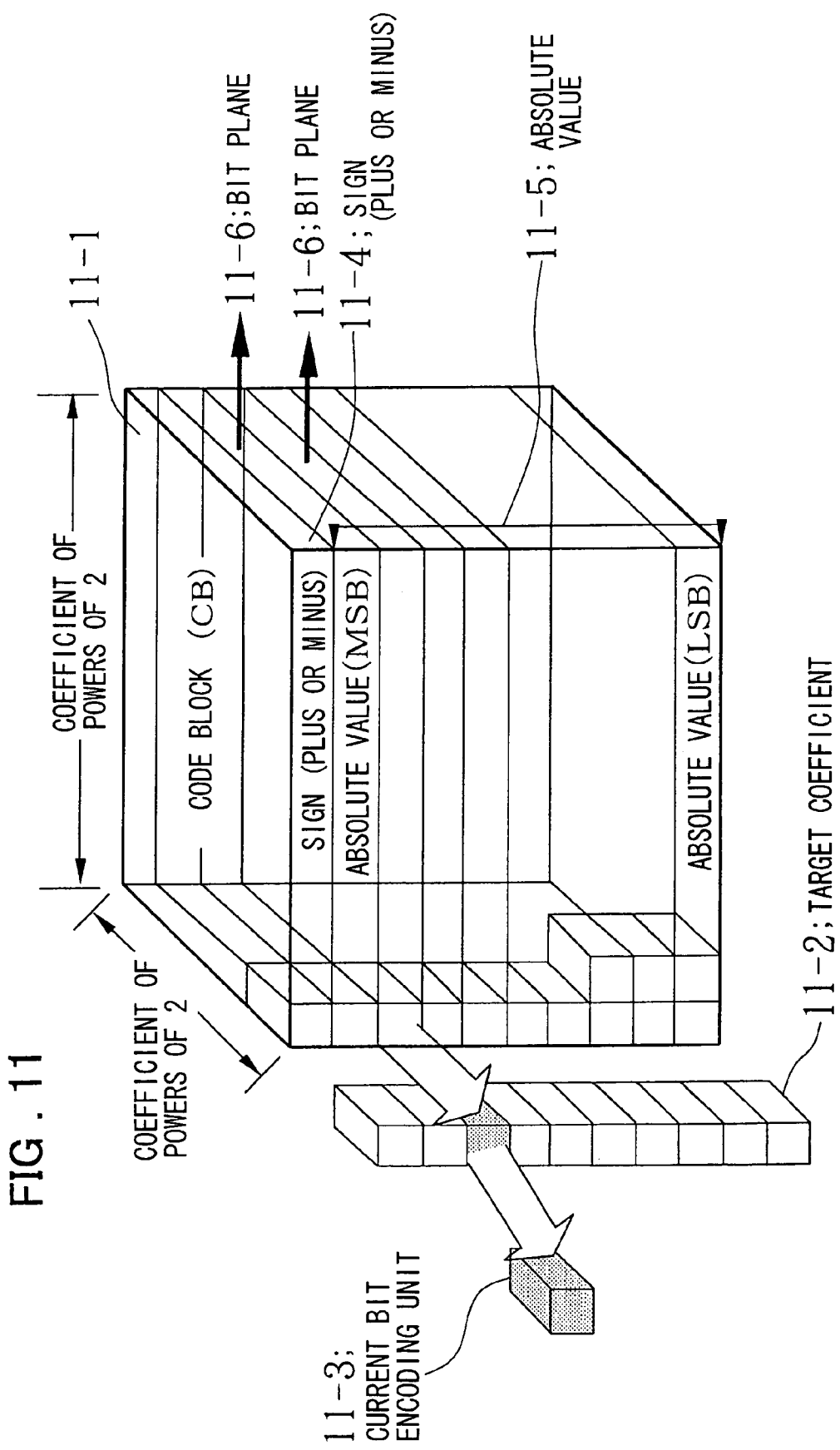
FIG. 11 depicts the structure of a code block (CB).
Figure 15:
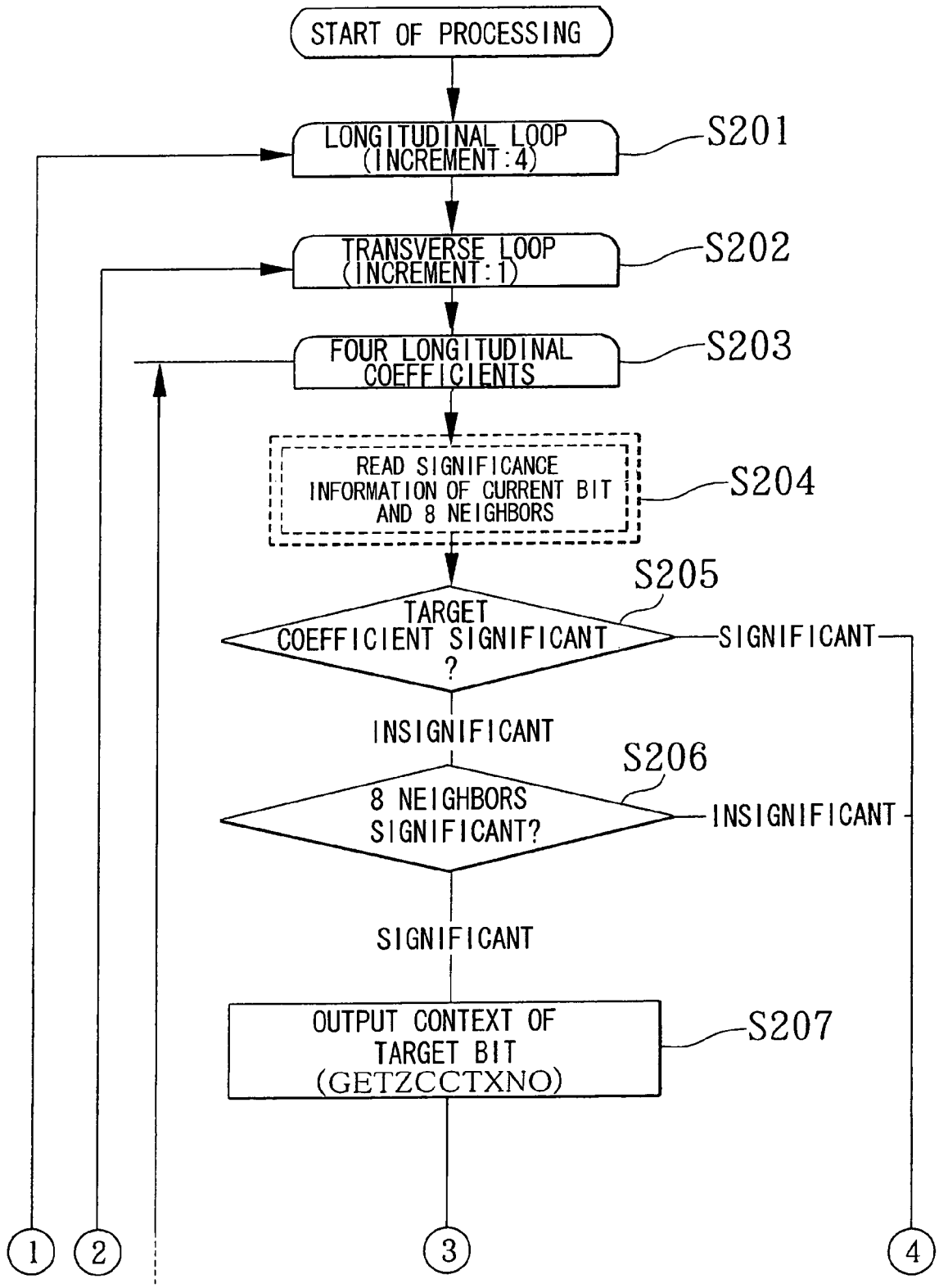
FIG. 15 is a flowchart (1) showing the SIG pass processing.
Figure 16:
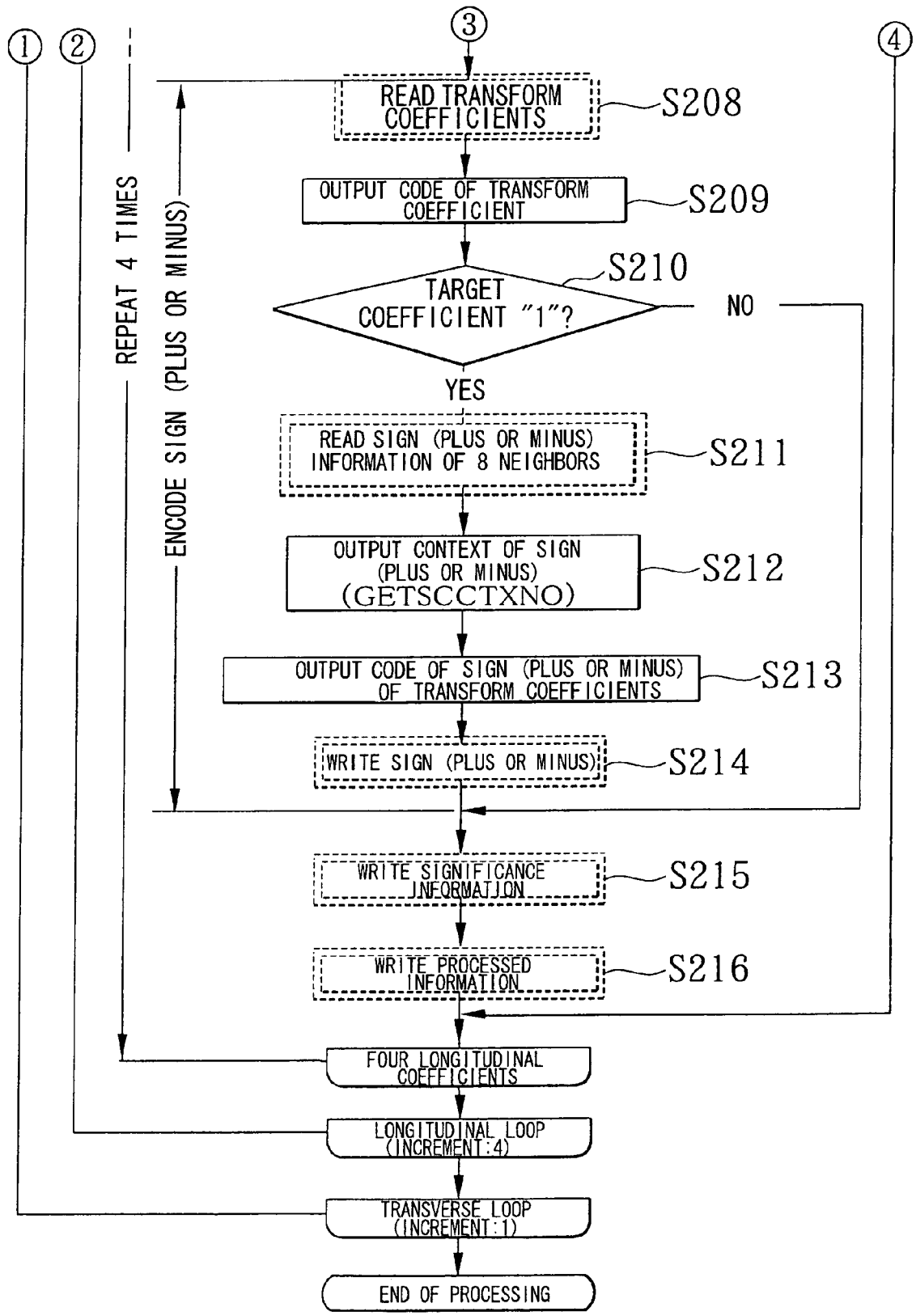
FIG. 16 is a flowchart (2) showing the SIG pass processing.
Figure 17:
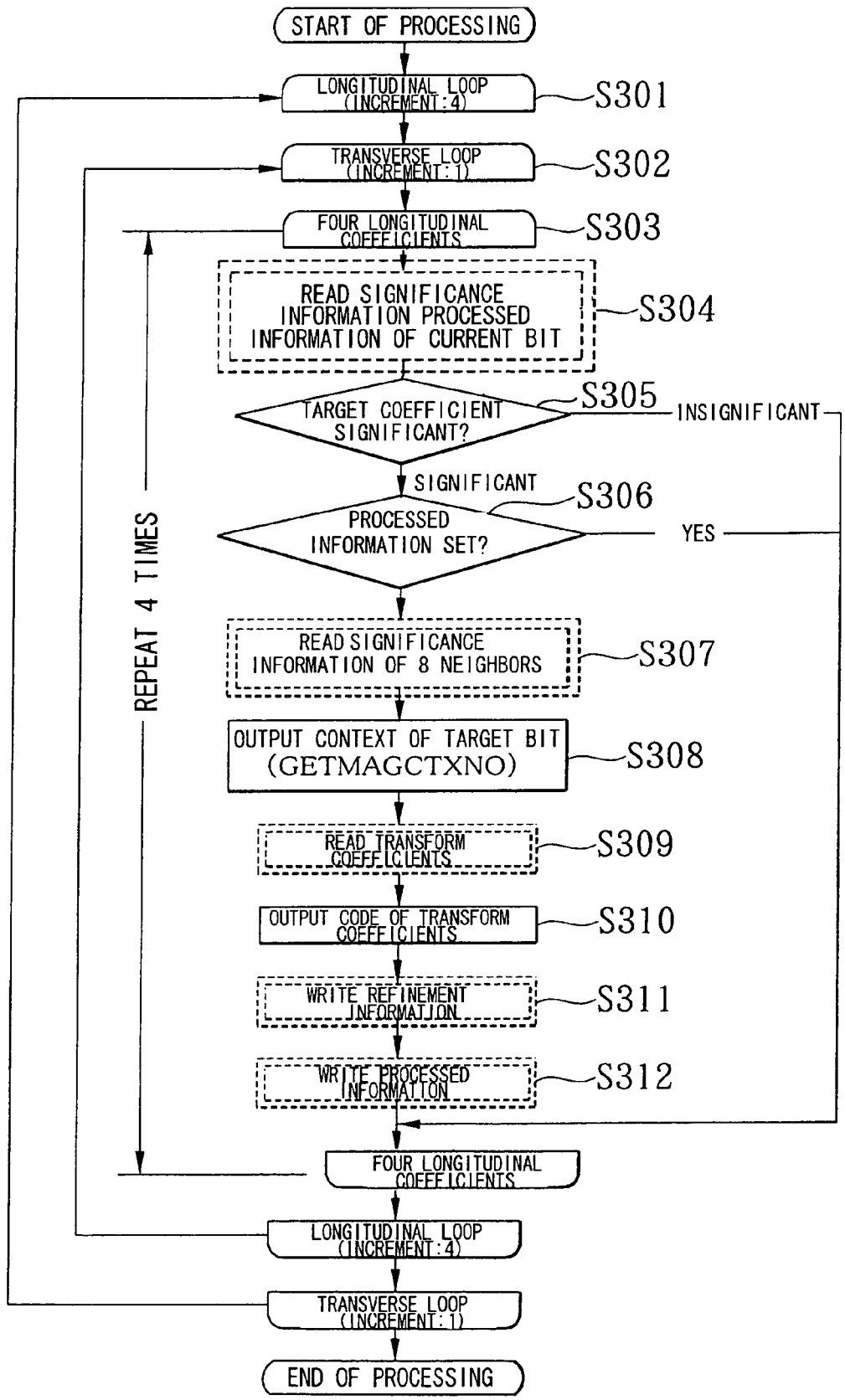
FIG. 17 is a flowchart showing the MAG pass processing.
Figure 18:
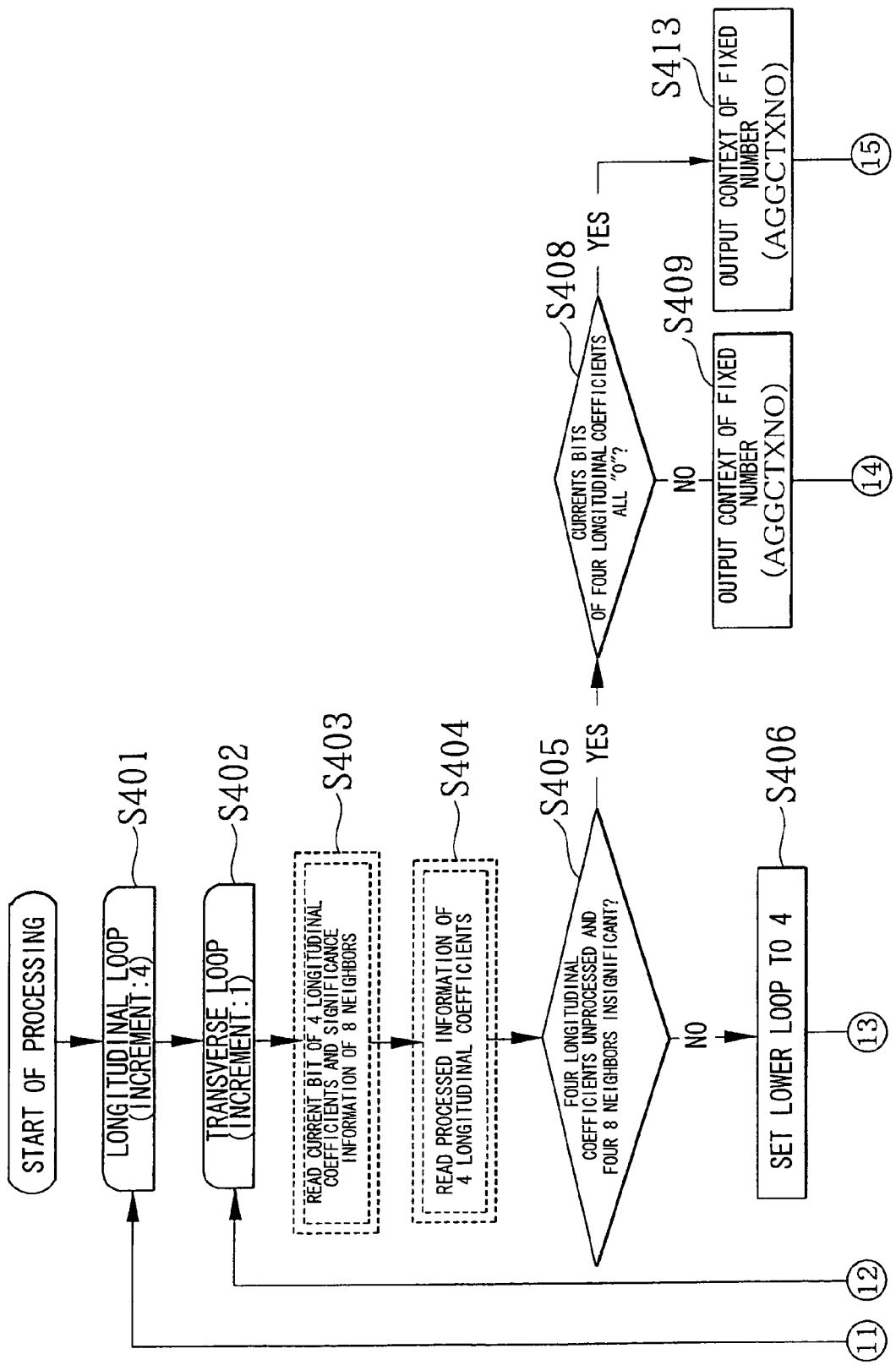
FIG. 18 is a flowchart (1-1) showing the CLN pass processing.
Figure 19:
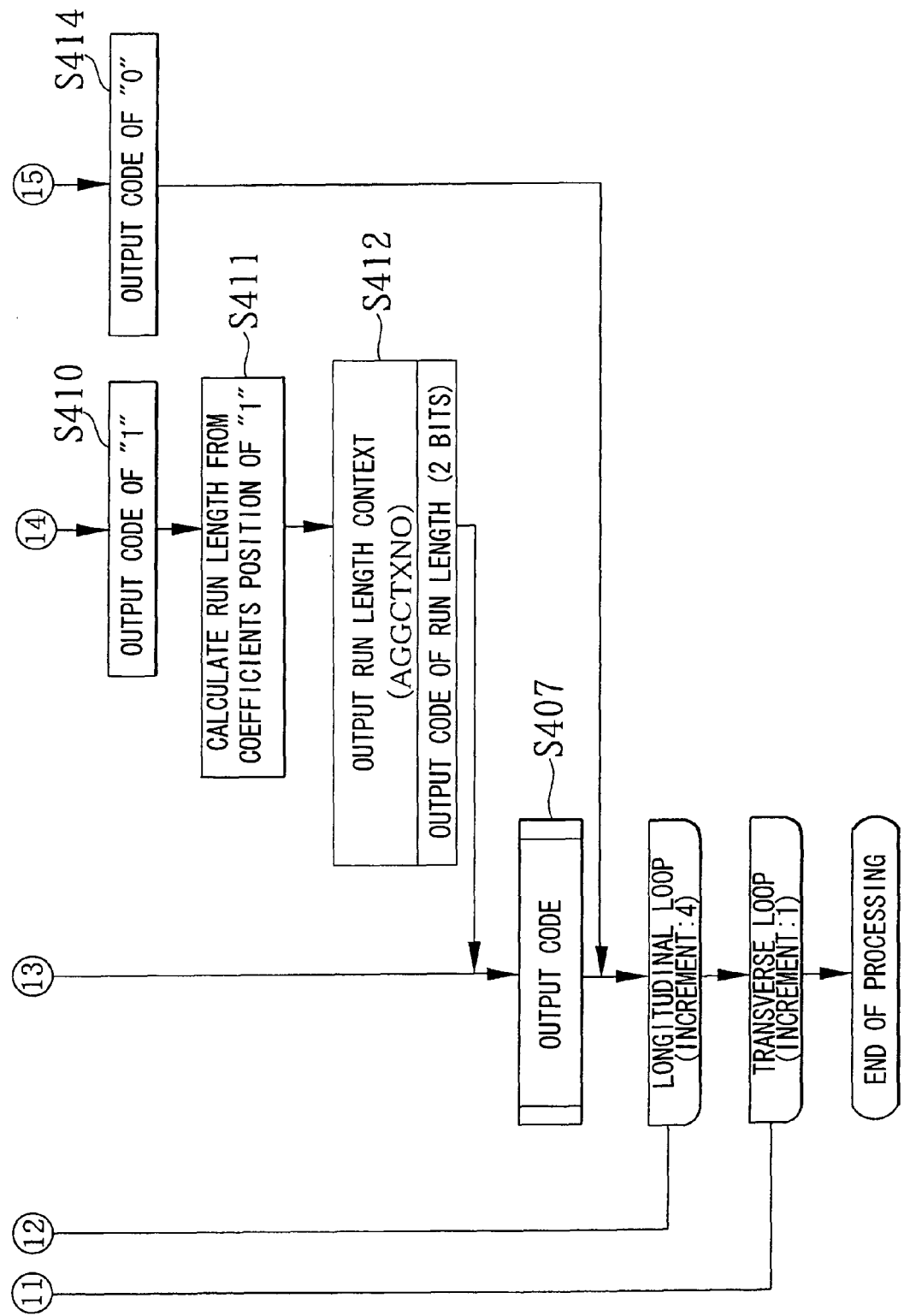
FIG. 19 is a flowchart (1-2) showing the CLN pass processing.
Figure 20:
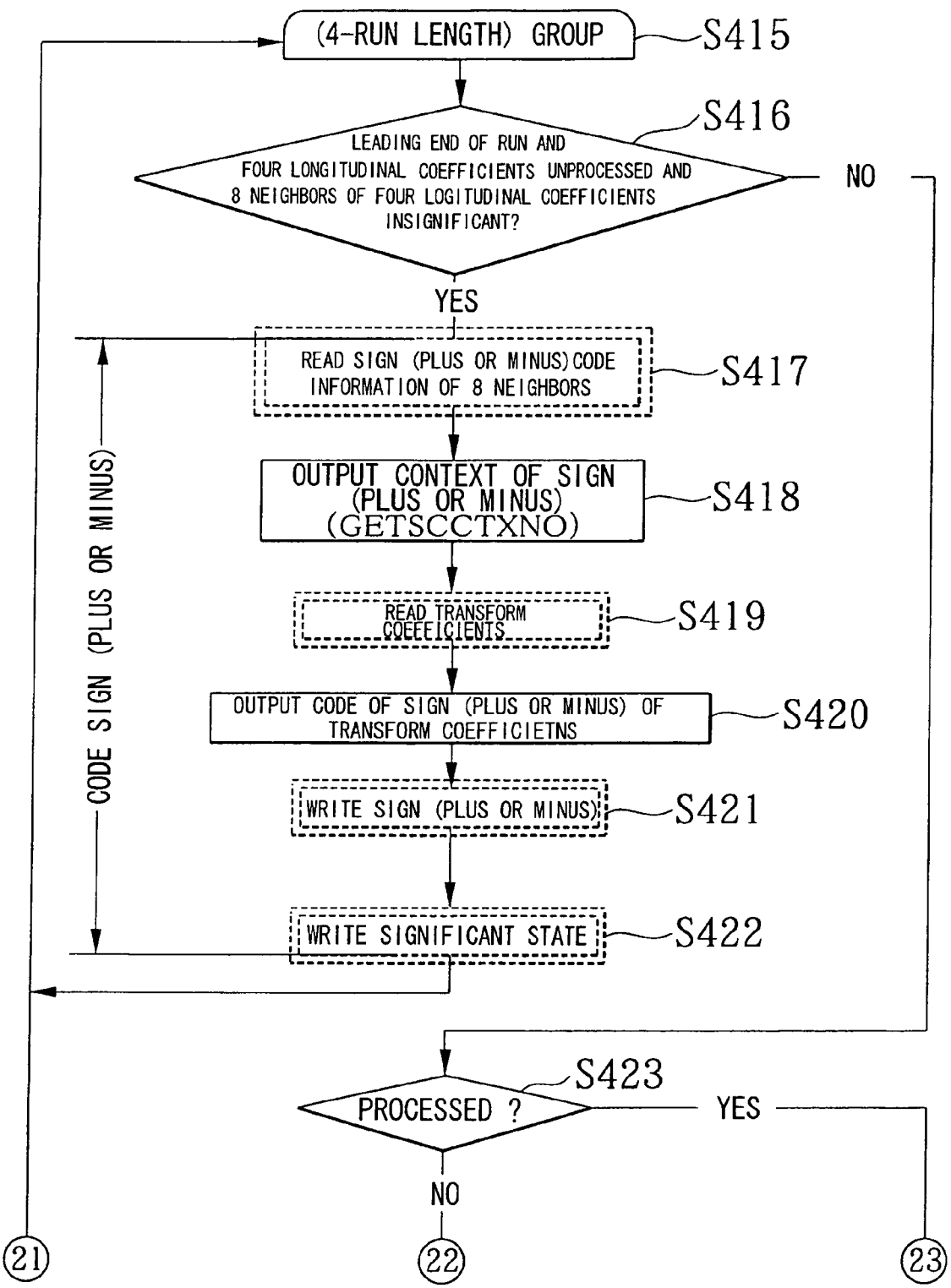
FIG. 20 is a flowchart (2-1) showing the CLN pass processing.
Figure 21:
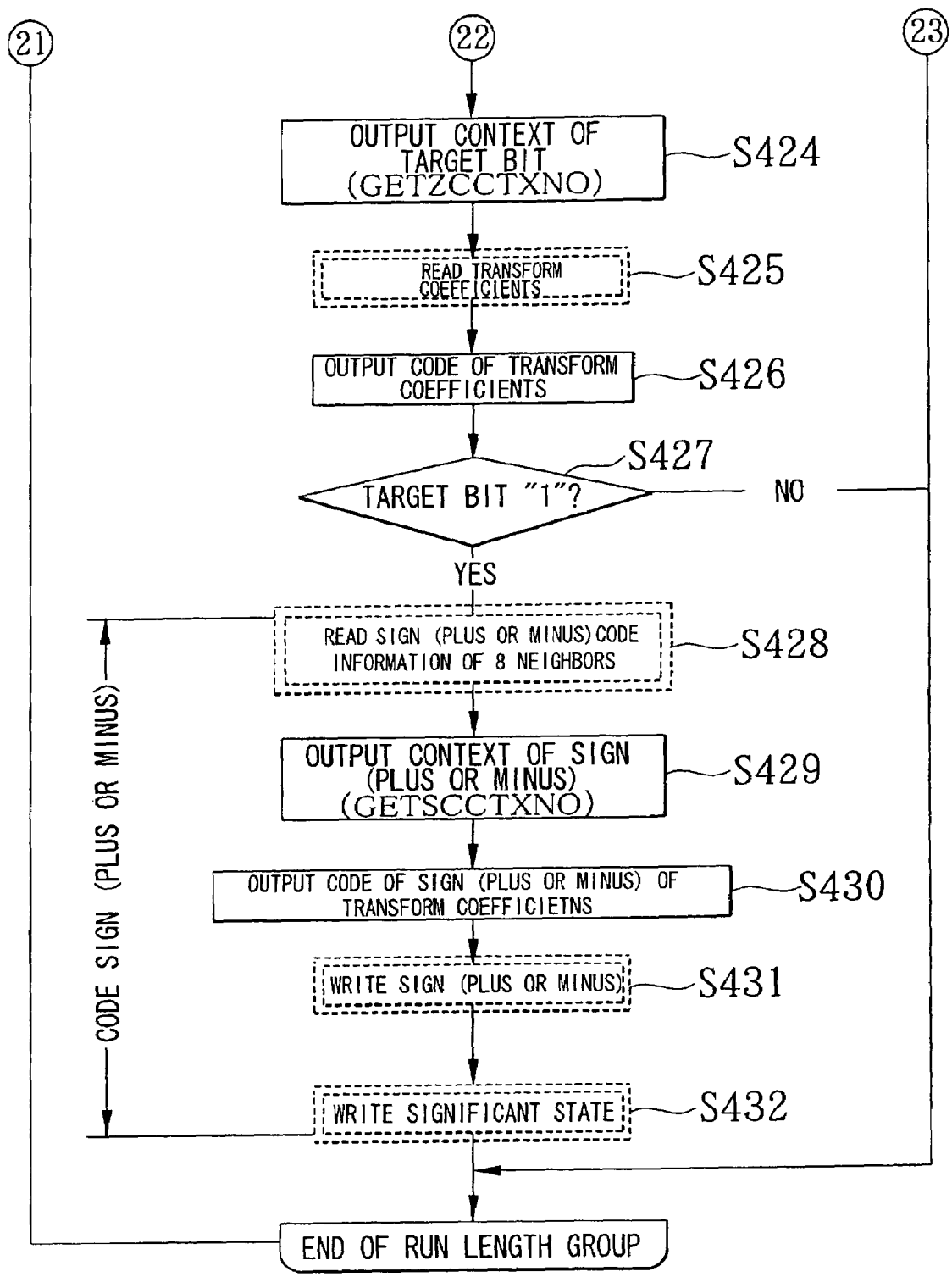
FIG. 21 is a flowchart (2-2) showing the CLN pass processing.

Specifically, with the SIG pass processing, shown in FIGS. 15 and 16, 9 accesses for reading the significance information (step S204), 8 accesses for reading the sign (plus or minus) information (step S211), one access for reading the transform coefficients (step S208), one access for writing the sign (plus or minus) information (step S214), one access for writing the significance information (step S215) and one access for writing the processed information (step S216), so that a sum total of 21 memory accesses are needed. In the present embodiment, six accesses for reading the significance information, one access for reading the significance information, six accesses for reading the sign (plus or minus) information, one access for writing the transform coefficients, one access for writing the significance information and one access for writing the processed information, are needed, with the sum total of the accessing operations being 15, thus enabling the number of times of memory accesses to be reduced to approximately three-fourths of that in the first conventional art described above.

In the multi-level image encoding/decoding apparatus of the present embodiment, the information volume of the same size as the code block size, which represents the necessary minimum information quantity, suffices, thus reducing the amount of the memory consumption. By way of comparison with the case of the code block of 64×64 coefficients, the information quantity for the second conventional art is 64×64 (coefficients)×20 (bits)=81920 bits, whereas, in the present embodiment, the information quantity is 64×64 (coefficients)×4 (the number of memories, namely the significance information memory, plus/minus sign memory, processed information memory and the refinement information memory)=16384 bits, which is one-fifth of that of the second conventional art described above.

Second Embodiment

Figure 5:
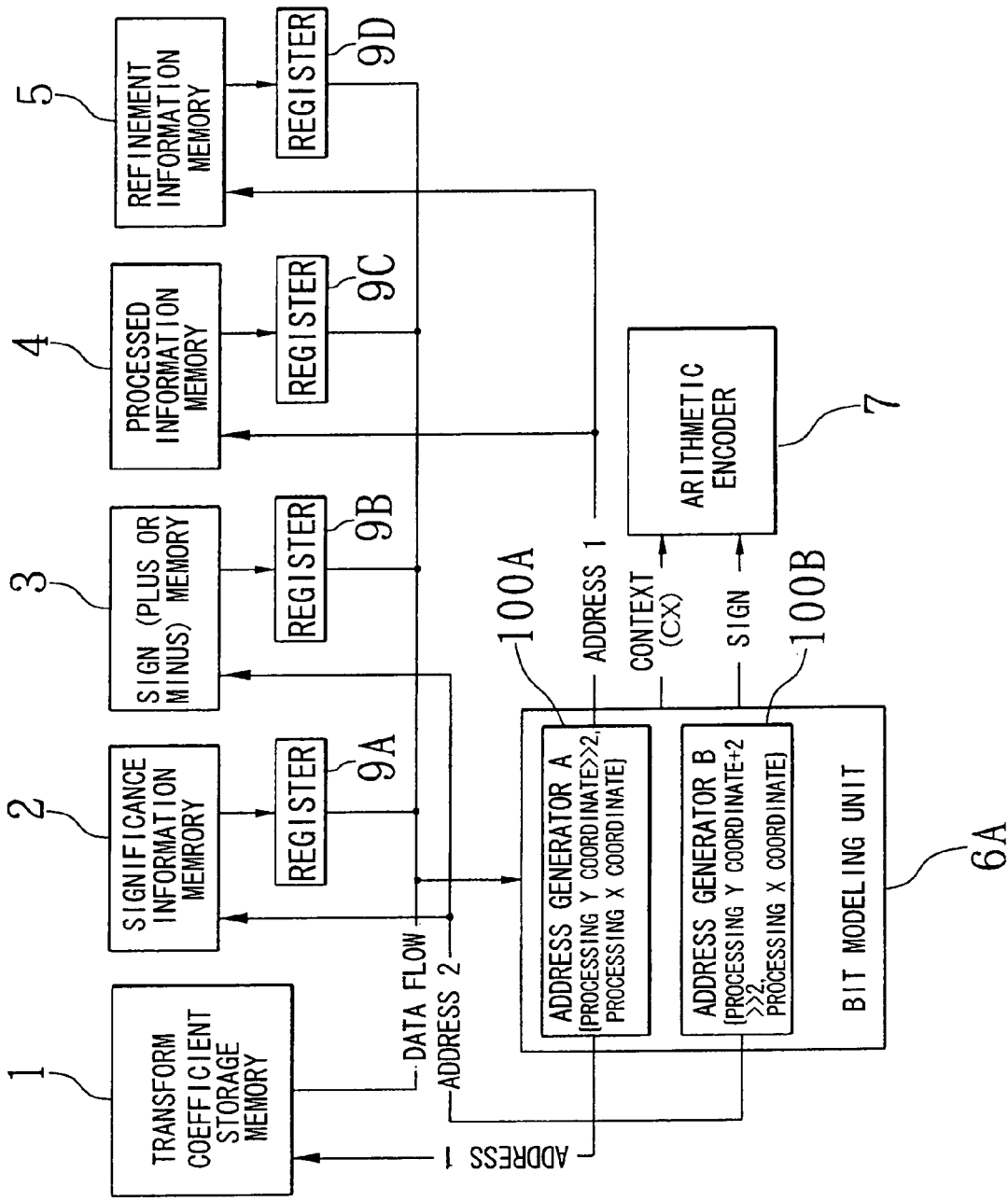
FIG. 5 is a block diagram showing the structure of a multi-level image encoding/decoding apparatus according to a second embodiment of the present invention.

FIG. 5 is a block diagram showing the structure of a multi-level image encoding/decoding apparatus according to a second embodiment of the present invention.

Referring to FIG. 5, the multi-level image encoding/decoding apparatus of the present embodiment comprises a transform coefficient storage memory 1, a significance information memory 2, a plus/minus sign memory 3, a processed information memory 4, a refinement information memory 5, a bit modeling unit 6A, an arithmetic encoder 7 and cache registers 9A, 9B, 9C and 9D. Of these, the transform coefficient storage memory 1, significance information memory 2, plus/minus sign memory 3, processed information memory 4, refinement information memory 5, bit modeling unit 6A and the arithmetic encoder 7 are similar to those of the first embodiment shown in FIG. 1.

The cache registers 9A to 9D hold data, read last time from the significance information memory 2, plus/minus sign memory 3, processed information memory 4 and the refinement information memory 5, until the time of the next processing.

The operation of the cache registers 9A to 9D in the multi-level image encoding/decoding apparatus of the present embodiment is now explained.

In the bit scanning in the bit plane, the operation of processing the four vertical coefficients in the vertical direction and shifting by one column in the horizontal direction to perform the same processing, is repeated. Thus, if the pass processing of the four vertical coefficients 4-10, including the current bit 4-1, shown in FIG. 4, is considered, data 4-2, 4-3, 4-6 and 4-7 in the vicinity of the eight neighbors of the four vertical coefficients 4-10, stored in the cache register for the sign (plus or minus) information, are re-used, so that it is only sufficient to perform memory accesses for reading two words of 4-4 and 4-9 of the eight neighbors of the four vertical coefficients. When the processing shifts horizontally to perform the pass processing of the four vertical coefficients 4-11, it is sufficient to read out two words of 4-5 and 4-9 newly.

As for the processed information and the refinement information, it is sufficient to perform one word read access prior to pass processing of the four vertical coefficients to store the word in the cache register for the processed information 9C and in the cache register in the refinement information 9D to then perform one word write access to the processed information memory 4 and the refinement information memory after pass processing. Thus, it is unnecessary to perform readout and write from one coefficient to another, as in the conventional art, thus enabling the number of times of memory accesses to be reduced.

Thus, in the present embodiment of the multi-level image encoding/decoding apparatus, in which the cache registers 9A to 9C are added to hold the information used in the previous processing operations, the number of times of read accesses of the significance information is two instead of six, that of the sign (plus or minus) information is two instead of six, that of the transform coefficients is one, the number of times of writing of the significance information is two for four coefficients and that of the processed information is one for four coefficients, as compared to the case of the first embodiment. Thus, total the number of times of the read accesses is 5.75, and hence the number of times of the memory accesses is approximately one-fourth of that in the first embodiment.

Third Embodiment

Figure 6:
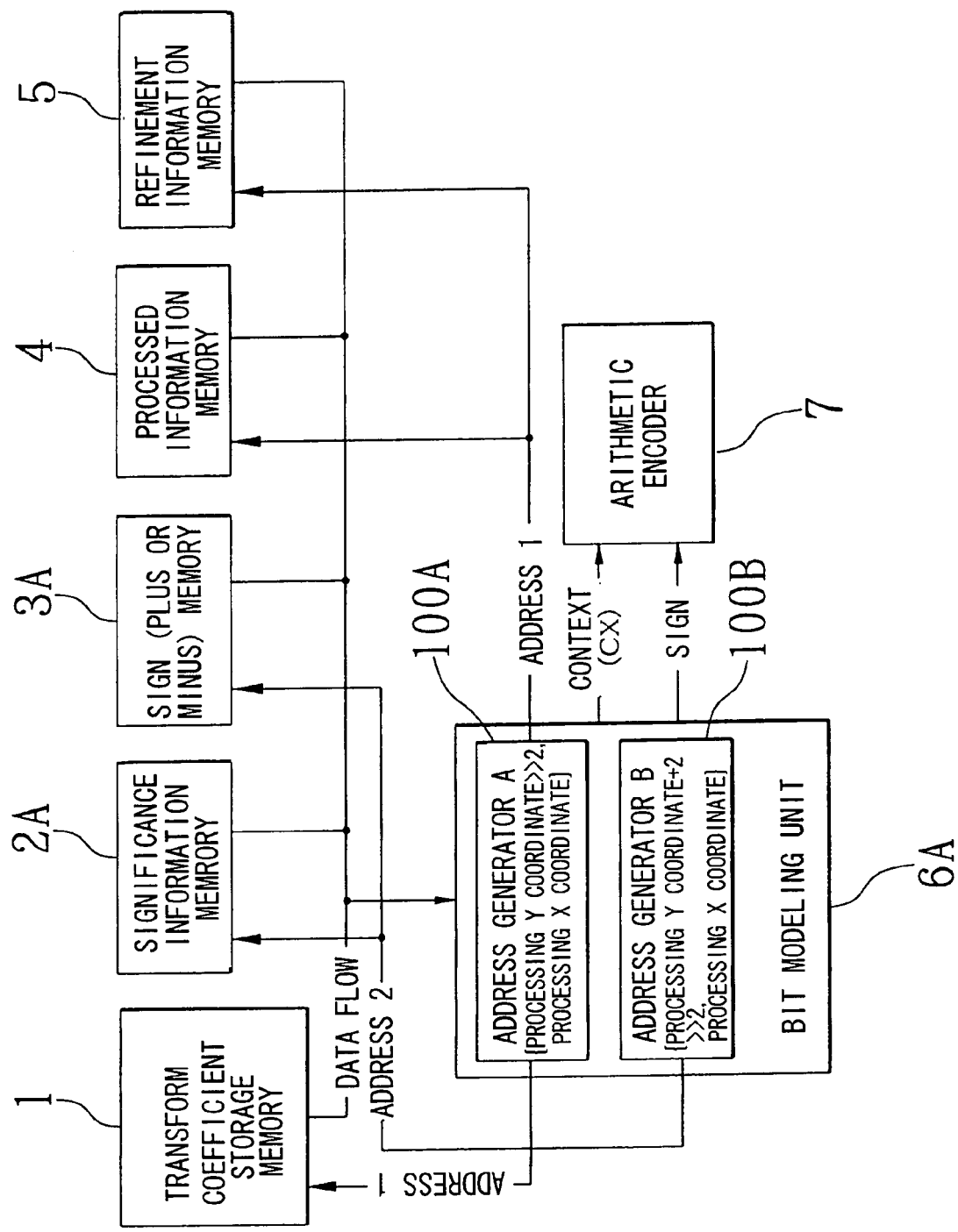
FIG. 6 is a block diagram showing the structure of a multi-level image encoding/decoding apparatus according to a third embodiment of the present invention.
Figure 7:
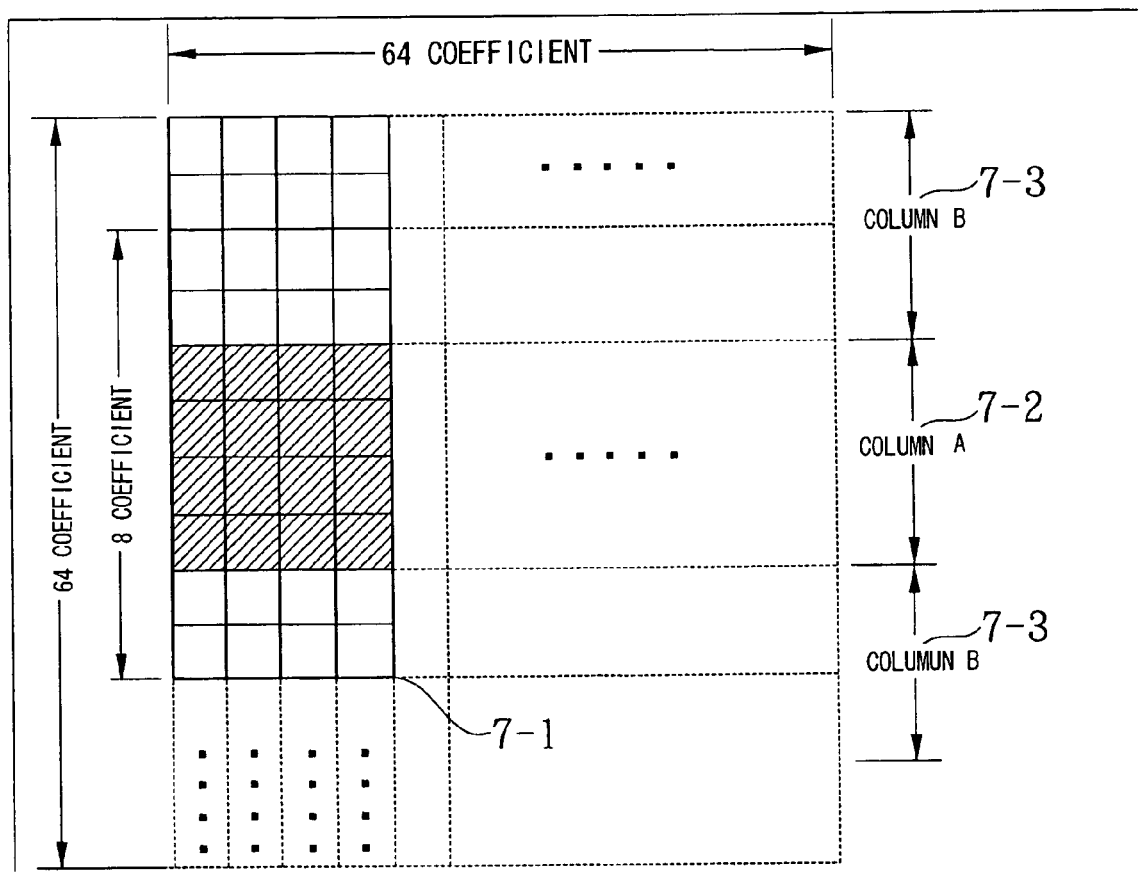
FIG. 7 depicts a word configuration of the significance information memory and the sign (positive or negative) memory in the multi-level image encoding/decoding apparatus shown in FIG. 6.

FIG. 6 is a block diagram showing the structure of a third embodiment of the multi-level image encoding/decoding apparatus according to the present invention and FIG. 7 shows the word structure of the significance information memory and the plus/minus sign memory in the present embodiment of the multi-level image encoding/decoding apparatus.

Referring to FIG. 6, the multi-level image encoding/decoding apparatus of the present embodiment comprises a transform coefficient storage memory 1, a significance information memory 2A, a plus/minus sign memory 3A, a processed information memory 4, a refinement information memory 5, a bit modeling unit 6A, and an arithmetic encoder 7. Of these, the transform coefficient storage memory 1, processed information memory 4, refinement information memory 5, bit modeling unit 6A and the arithmetic encoder 7 are similar to those of the first embodiment shown in FIG. 1.

In the significance information memory 2A and the plus/minus sign memory 3A, each word is made up by a number of coefficients equal to a multiple of 4. For example, each word of the significance information memory 2A or the plus/minus sign memory 3A is made up by 8 or 12 coefficients.

The operation of the significance information memory 2A and the plus/minus sign memory 3A in the present embodiment of the multi-level encoding/decoding apparatus is hereinafter explained.

FIG. 7 shows an instance where 8 (=4×2) coefficients are stored in one word. In this case, a word boundary line 7-1 indicates a memory word boundary. As may be seen from FIG. 7, if it is desired to acquire the information of eight neighbors of the four vertical coefficients of a column A7-2, upper and lower neighbor coefficients are each stored in one word, so that it is sufficient to access the targeted four vertical coefficients and coefficients on the left and right sides thereof, totaling at 3 words.

It may also be seen that, for the column B7-3, it is sufficient to perform 6=(2×3) times of memory accesses, as in the first embodiment described above.

For 12 (=4×3) or more coefficients, the number of the locations corresponding to the column A7-2, for which three memory accesses suffice, is increased, so that the number of times of memory accesses is decreased further.

Specifically, when one word is made up by a number of coefficients equal to N times 4, for 64×64 coefficients, the number of times of memory accesses may be represented by the following equations:

[A number of memory accesses] =

$$int\left(\frac{64}{4\times N}\times 2 + \frac{64}{4\times N}\times (N-1) + 0.5\right)\times 64$$

It is seen from the above equation that, with e.g., 64×64 coefficients, the number of times of memory accesses in case four coefficients are stored in one word is 2048, while that in case 16 (=4×4) coefficients are stored in one word is 1280, so that the number of times of memory accesses may be decreased appreciably.

Thus, in the present embodiment of the multi-level image encoding/decoding apparatus, in which, in the significance information memory 2A and the plus/minus sign memory 3A, one word is formed by a number of coefficients equal to a multiple of 4, so that the number of times of memory accesses may be smaller than in the first embodiment in which one word is made up by four coefficients.

Fourth Embodiment

Figure 8:
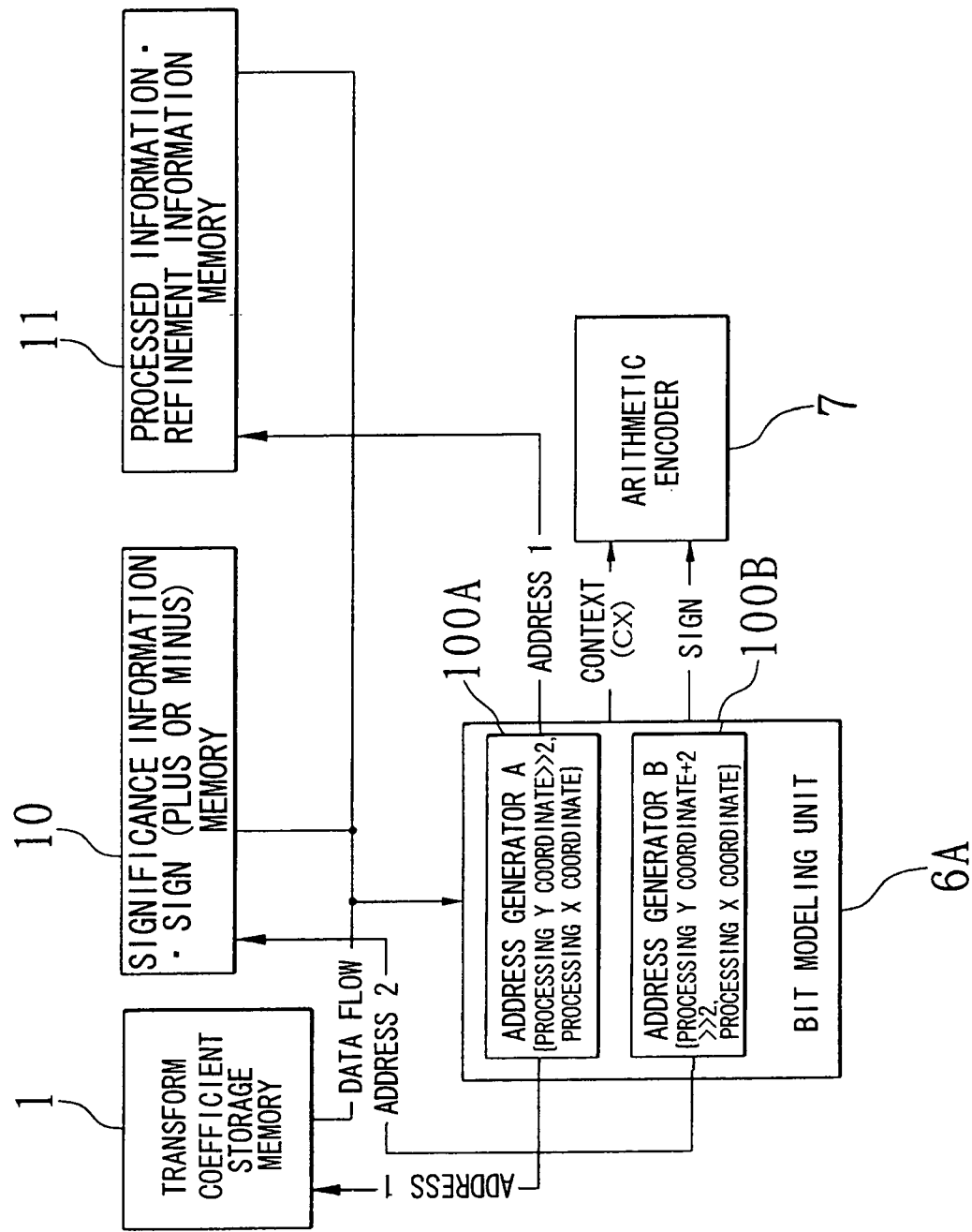
FIG. 8 is a block diagram showing the structure of a multi-level image encoding/decoding apparatus according to a fourth embodiment of the present invention.

FIG. 8 is a block diagram showing the structure of a multi-level image encoding/decoding apparatus according to a fourth embodiment of the present invention.

Referring to FIG. 8, the multi-level image encoding/decoding apparatus of the present embodiment comprises a transform coefficient storage memory 1, a bit modeling unit 6A, an arithmetic encoder 7, a significance information plus/minus sign memory 10 and a processed information-refinement information memory 11. Of these, the transform coefficient storage memory 1, bit modeling unit 6A and the arithmetic encoder 7 are similar to those of the first embodiment shown in FIG. 1.

The significance information plus/minus sign memory 10 has stored therein each four bits of the significance information and the sign (plus or minus) information, totaling at eight bits, in one word made up by the significance information and the sign (plus or minus) information.

Similarly, the processed information-refinement information memory 11 has stored each four bits of the processed information and the refinement information, totaling at eight bits, in one word made up of the processed information and the refinement information.

The operation of the present embodiment of the multi-level image encoding/decoding apparatus is similar to that of the first embodiment. Specifically, each four bits of the processed information and the refinement information may be read from the significance information plus/minus sign memory 10, by an access from the bit modeling unit 6A, for processing, while each four bits of the processed information and the refinement information may be read from the processed information memory refinement information memory 11, for processing.

Thus, in the present embodiment of the multi-level image encoding/decoding apparatus, the significance information and the sign (plus or minus) information of the same memory map configuration are collected together and stored in the same address of the significance information plus/minus sign memory 10, while the processed information and the refinement information of the same memory map configuration are collected together and stored in the same address of the processed information memory refinement information memory 11, so that it is sufficient to have three memories, that is the transform coefficient storage memory 1, significance information plus/minus sign memory 10 and the processed information memory refinement information memory 11, as memories, thus enabling the number of the memories to be reduced.

Fifth Embodiment

FIG. 9 is a block diagram showing the structure of a multi-level image encoding/decoding apparatus according to a fifth embodiment of the present invention.

Referring to FIG. 9, the multi-level image encoding/decoding apparatus of the present embodiment comprises a transform coefficient storage memory 1, a significance information memory 2A, a plus/minus sign memory 3A, a processed information memory 4, a refinement information memory 5, a bit modeling unit 6A, an arithmetic encoder 7, and cache registers 9A, 9B, 9C and 9D. Of these, the transform coefficient storage memory 1, significance information memory 2A, plus/minus sign memory 3A, processed information memory 4, refinement information memory 5, bit modeling unit 6A and the arithmetic encoder 7 are similar to those of the third embodiment shown in FIG. 1. The cache registers 9A, 9B, 9C and 9D are similar to those shown in FIG. 5.

In the present embodiment of the multi-level image encoding/decoding apparatus, one word is made up by a number of coefficients equal to a multiple of four, so that the number of memory accesses can be reduced, as in the third embodiment.

Moreover, since the cache registers 9A to 9D are provided, the number of times of memory accesses can be reduced as in the second embodiment.

Thus, in the present embodiment of the multi-level image encoding/decoding apparatus, in which the effect of the second embodiment may be produced in addition to that of the third embodiment, it becomes possible to reduce the number of times of memory accesses further.

Although the embodiments of the present invention have been explained by referring to the drawings, the present invention is not limited to these specific embodiments and may comprise design changes that do not depart from the scope of the invention. For example, the cache registers for re-utilization of the information, shown in the second embodiment, may also be used not only in the first or third embodiment but also in the fourth embodiment. In the third embodiment, the significance information and the sign (plus or minus) information, collected into one word, is not limited to two or three times four but also a plural number of times of four inclusive of four or more times four. In these cases, it is possible to reduce the number of times of memory access operations, as in the above-described embodiments.

In the fourth embodiment, the information equal to N (N being an optional natural number) times 4 of each of the significance information, sign (plus or minus) information, processed information and the refinement information, may be collected in one word. Moreover, in the fourth embodiment and in the above-described case, one of the significance information—sign (plus or minus) information and the processed information—the refinement information may be collected in one word and stored in the memory, while the other may be stored, without being collected, in the respective memories. In any of these cases, the meritorious effect of reducing the number of memories may be achieved.

The meritorious effects of the present invention are summarized as follows.

With the multi-level image encoding/decoding apparatus of the present invention, in which the necessary information is collected in one word, the number of times of the memory accessing operations may be reduced. In this case, the number of times of memory accessing operations may be reduced further by adding a cache register to each memory.

The number of times of memory accessing operations may be reduced further by storing a number of coefficients equal to the multiples of 4 in the significance information memory and in the sign (plus or minus) information memory.

Additionally, according to the present invention, the volume of the information stored in the memory similar to the code block size suffices, so that the amount of memory consumption may be smaller.

According to the present invention, the significance information memory, plus/minus sign memory, processed information memory and the refinement information memory may be of the same size, and hence the physical memory arrangement or wiring may be facilitated to reduce the chip size.

Moreover, the number of memories may be decreased by storing different data of the same memory map structure, such as the significance information memory—plus/minus sign memory or the processed information memory—refinement information memory may be stored in the same address of given memories to reduce the number of the memories, so that the memory surface and hence the memory wiring volume represented by address and data lines may be reduced.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. An apparatus for performing multi-level image encoding/decoding, said apparatus comprising:
a transform coefficient storage memory for storing transform coefficients which are the result of wavelet transform of a multi-level image;
a significance information memory for storing information as to whether or not the transform coefficient is significant;
a plus/minus sign memory for storing information as to a sign of the transform coefficient;
a processed information memory for storing information as to whether or not bit modeling processing of the transform coefficient is completed;
a refinement information memory for storing information as to whether or not processing of an magnitude refinement pass of the transform coefficient is completed;
means for executing bit modeling processing on transform coefficients read from said transform coefficient storage memory, by using information obtained on accessing said significance information memory, said plus/minus sign memory, said processed information memory and said refinement information memory;
first address generating means for generating an address for accessing said processed information memory and said refinement information memory; and
second address generating means for generating an address for accessing said significance information memory and said plus/minus sign memory.

2. The apparatus as defined in claim 1, wherein said significance information memory, said plus/minus sign memory, said processed information memory and said refinement information memory are of the same memory size.

3. The apparatus as defined in claim 2, wherein processing of each stage in said bit modeling processing is carried out by one access operation from said first address generating means, by storing said transform coefficients with each four vertical coefficients located on a bit plane as one word in said processed information memory and in said refinement information memory; and wherein processing of each stage in said bit modeling processing is carried out by two access operations from said second address generating means, by storing information of eight neighbors of said four vertical coefficients in a word in said significance information memory and in said plus/minus sign memory with shifting of said vertical coordinates.

4. The apparatus as defined in claim 3, wherein
in said significance information and in said plus/minus sign memory, the vertical coordinates of said four vertical coefficients are shifted by +2.

5. The apparatus as defined in claim 1, wherein
in said significance information and in said plus/minus sign memory, one word is formed by a number of transform coefficients equal to multiples of four.

6. The apparatus as defined in claim 5, wherein
a cache register is provided in each one of said significance memory, said plus/minus sign memory, said processed information memory and said refinement information memory, and
information obtained on a previous access to the memory is stored in an associated cache register so as to be usable in a subsequent processing operation.

7. The apparatus as defined in claim 1, comprising:
a significance information-plus/minus sign information memory formed by collecting and storing information corresponding to N times four bits of each of said significance memory and said plus/minus sign memory in one word in said significance information-plus/minus sign information memory, N being a natural number; and/or,
a processed information-refinement information memory formed by collecting and storing information corresponding to said N times four bits of each of said processed information memory and said refinement memory in one word in said processed information-refinement information memory, wherein the significance information and plus/minus sign, and/or, the processed information and refinement information are able to be accessed with one access.

8. The apparatus as defined in claim 1, wherein a cache register is provided in each one of said significance memory, said plus/minus sign memory, said processed information memory and said refinement information memory, and information obtained on a previous access to the memory is stored in an associated cache register so as to be usable in a subsequent processing operation.

* * * * *